(12) United States Patent
Hong et al.

(10) Patent No.: US 12,293,433 B2
(45) Date of Patent: May 6, 2025

(54) REAL-TIME MODIFICATIONS IN AUGMENTED REALITY EXPERIENCES

(71) Applicant: Snap Inc., Santa Monica, CA (US)

(72) Inventors: Kevin Yimeng Hong, Los Angeles, CA (US); Amar Boghani, Los Angeles, CA (US); Mansoor Basha Patan, Sunnyvale, CA (US); Tony Mathew, Los Angeles, CA (US); Rastan Boroujerdi, Hermosa Beach, CA (US); Peng Deng, Playa Vista, CA (US)

(73) Assignee: SNAP INC., Santa Monica, CA (US)

( * ) Notice: Subject to any disclaimer, the term of this patent is extended or adjusted under 35 U.S.C. 154(b) by 179 days.

(21) Appl. No.: 17/728,494

(22) Filed: Apr. 25, 2022

(65) Prior Publication Data

US 2023/0342988 A1    Oct. 26, 2023

(51) Int. Cl.
| | | |
|---|---|---|
| *G06T 11/00* | (2006.01) | |
| *G06F 3/01* | (2006.01) | |
| *G06F 3/0482* | (2013.01) | |

(52) U.S. Cl.
CPC .............. *G06T 11/00* (2013.01); *G06F 3/011* (2013.01); *G06F 3/0482* (2013.01); *G06T 2200/24* (2013.01)

(58) Field of Classification Search
CPC ...... G06T 11/00; G06T 2200/24; G06F 3/011; G06F 3/0482
See application file for complete search history.

(56) References Cited

U.S. PATENT DOCUMENTS

| | | |
|---|---|---|
| 5,604,843 A | 2/1997 | Shaw et al. |
| 5,689,559 A | 11/1997 | Park |
| 5,880,731 A | 3/1999 | Liles et al. |
| (Continued) | | |

FOREIGN PATENT DOCUMENTS

| | | |
|---|---|---|
| CN | 101802547 A | 8/2010 |
| CN | 109863532 A | 6/2019 |
| (Continued) | | |

OTHER PUBLICATIONS

"International Application Serial No. PCT/US2023/065988, International Search Report mailed Sep. 12, 2023", 5 pgs.

(Continued)

*Primary Examiner* — Yu Chen
(74) *Attorney, Agent, or Firm* — SCHWEGMAN LUNDBERG & WOESSNER, P.A.

(57) ABSTRACT

Methods and systems are disclosed for generating AR experiences on a messaging platform. The methods and systems establish a shared augmented reality (AR) experience across a plurality of client devices and receive, from a first client device of the plurality of client devices, a request to perform a real-time interaction with a given AR element that is presented on displays of the plurality of client devices. In response to receiving the request, the methods and system enable the first client device to perform one or more modifications to the given AR element while preventing a second of the plurality of client devices from performing real-time interactions with the given AR element. The method and system synchronize the one or more modifications of the given AR element performed by the first client device across each of the plurality of client devices in real time.

20 Claims, 11 Drawing Sheets

(56) References Cited

U.S. PATENT DOCUMENTS

| | | |
|---|---|---|
| 6,023,270 A | 2/2000 | Brush, II et al. |
| RE36,919 E | 10/2000 | Park |
| RE37,052 E | 2/2001 | Park |
| 6,223,165 B1 | 4/2001 | Lauffer |
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres Del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,846,972 B2 | 12/2017 | Montgomerie et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,102,680 B2 | 10/2018 | Jurgenson et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,217,488 B1 | 2/2019 | Huang |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,319,149 B1 | 6/2019 | Cowburn et al. |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,559,107 B1 | 2/2020 | Charlton et al. |
| 10,565,795 B2 | 2/2020 | Charlton et al. |
| 10,573,048 B2 | 2/2020 | Ni et al. |
| 10,607,053 B1 | 3/2020 | Boyd et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,679,428 B1 | 6/2020 | Chen et al. |
| 10,762,174 B2 | 9/2020 | Denton et al. |
| 10,776,981 B1 | 9/2020 | Gorbatyuk et al. |
| 10,789,453 B2 | 9/2020 | Savchenkov et al. |
| 10,803,664 B2 | 10/2020 | McPhee et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,902,661 B1 | 1/2021 | Mourkogiannis et al. |
| 10,902,684 B2 * | 1/2021 | Srinivasan .......... G06F 3/04815 |
| 10,933,311 B2 | 3/2021 | Brody et al. |
| 10,938,758 B2 | 3/2021 | Allen et al. |
| 10,956,743 B1 | 3/2021 | Li et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 10,997,787 B2 | 5/2021 | Ge et al. |
| 11,010,022 B2 | 5/2021 | Alvi et al. |
| 11,030,789 B2 | 6/2021 | Chand et al. |
| 11,036,781 B1 | 6/2021 | Baril et al. |
| 11,050,691 B1 | 6/2021 | DePue et al. |
| 11,063,891 B2 | 7/2021 | Voss |
| 11,063,937 B1 | 7/2021 | Son et al. |
| 11,069,103 B1 | 7/2021 | Blackstock et al. |
| 11,080,917 B2 | 8/2021 | Monroy-hernández et al. |
| 11,087,543 B1 | 8/2021 | Cowburn et al. |
| 11,092,998 B1 | 8/2021 | Castañeda et al. |
| 11,112,945 B1 | 9/2021 | Al Majid et al. |
| 11,128,586 B2 | 9/2021 | Al Majid et al. |
| 11,165,734 B1 | 11/2021 | Desserrey et al. |
| 11,169,675 B1 | 11/2021 | Anvaripour et al. |

(56) References Cited

U.S. PATENT DOCUMENTS

| | | | |
|---|---|---|---|
| 11,170,393 B1 | 11/2021 | Ma et al. | |
| 11,176,737 B2 | 11/2021 | Hare et al. | |
| 11,188,190 B2 | 11/2021 | Blackstock et al. | |
| 11,189,070 B2 | 11/2021 | Jahangiri et al. | |
| 11,189,104 B2 | 11/2021 | Goodrich et al. | |
| 11,195,018 B1 | 12/2021 | Cowburn et al. | |
| 11,199,957 B1 | 12/2021 | Alvi et al. | |
| 11,204,959 B1 | 12/2021 | Boyd et al. | |
| 11,212,331 B1 | 12/2021 | Gaiduchenko et al. | |
| 11,217,020 B2 | 1/2022 | Goodrich et al. | |
| 11,218,433 B2 | 1/2022 | Baldwin et al. | |
| 11,227,442 B1 | 1/2022 | Goodrich et al. | |
| 11,227,637 B1 | 1/2022 | Collins et al. | |
| 11,229,849 B2 | 1/2022 | Blackstock et al. | |
| 11,232,040 B1 | 1/2022 | Ahmed et al. | |
| 11,245,658 B2 | 2/2022 | Grantham et al. | |
| 11,249,614 B2 | 2/2022 | Brody | |
| 11,258,738 B1 | 2/2022 | Cieslak et al. | |
| 11,263,254 B2 | 3/2022 | Baril et al. | |
| 11,263,817 B1 | 3/2022 | Goodrich et al. | |
| 11,270,491 B2 | 3/2022 | Monroy-Hernández et al. | |
| 11,275,453 B1 | 3/2022 | Tham et al. | |
| 11,276,190 B2 | 3/2022 | Duan et al. | |
| 11,284,144 B2 | 3/2022 | Kotsopoulos et al. | |
| 11,587,255 B1 | 2/2023 | Micusik et al. | |
| 2002/0067362 A1 | 6/2002 | Agostino Nocera et al. | |
| 2002/0169644 A1 | 11/2002 | Greene | |
| 2005/0162419 A1 | 7/2005 | Kim et al. | |
| 2005/0206610 A1 | 9/2005 | Cordelli | |
| 2006/0294465 A1 | 12/2006 | Ronen et al. | |
| 2007/0113181 A1 | 5/2007 | Blattner et al. | |
| 2007/0168863 A1 | 7/2007 | Blattner et al. | |
| 2007/0176921 A1 | 8/2007 | Iwasaki et al. | |
| 2007/0198744 A1* | 8/2007 | Wensley | H04L 65/4053 709/248 |
| 2008/0158222 A1 | 7/2008 | Li et al. | |
| 2009/0016617 A1 | 1/2009 | Bregman-amitai et al. | |
| 2009/0055484 A1 | 2/2009 | Vuong et al. | |
| 2009/0070688 A1 | 3/2009 | Gyorfi et al. | |
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0177976 A1 | 7/2009 | Bokor et al. | |
| 2009/0202114 A1 | 8/2009 | Morin et al. | |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0023885 A1 | 1/2010 | Reville et al. | |
| 2010/0115426 A1 | 5/2010 | Liu et al. | |
| 2010/0162149 A1 | 6/2010 | Sheleheda et al. | |
| 2010/0203968 A1 | 8/2010 | Gill et al. | |
| 2010/0227682 A1 | 9/2010 | Reville et al. | |
| 2011/0093780 A1 | 4/2011 | Dunn | |
| 2011/0115798 A1 | 5/2011 | Nayar et al. | |
| 2011/0148864 A1 | 6/2011 | Lee et al. | |
| 2011/0239136 A1 | 9/2011 | Goldman et al. | |
| 2012/0113106 A1 | 5/2012 | Choi et al. | |
| 2012/0124458 A1 | 5/2012 | Cruzada | |
| 2012/0130717 A1 | 5/2012 | Xu et al. | |
| 2013/0103760 A1 | 4/2013 | Golding et al. | |
| 2013/0201187 A1 | 8/2013 | Tong et al. | |
| 2013/0249948 A1 | 9/2013 | Reitan | |
| 2013/0257877 A1 | 10/2013 | Davis | |
| 2013/0293468 A1* | 11/2013 | Perez | G06F 3/033 345/158 |
| 2014/0043329 A1 | 2/2014 | Wang et al. | |
| 2014/0055554 A1 | 2/2014 | Du et al. | |
| 2014/0125678 A1 | 5/2014 | Wang et al. | |
| 2014/0129343 A1 | 5/2014 | Finster et al. | |
| 2015/0206349 A1 | 7/2015 | Rosenthal et al. | |
| 2016/0133230 A1 | 5/2016 | Daniels et al. | |
| 2016/0134840 A1 | 5/2016 | Mcculloch | |
| 2016/0234149 A1 | 8/2016 | Tsuda et al. | |
| 2017/0080346 A1 | 3/2017 | Abbas | |
| 2017/0087473 A1 | 3/2017 | Siegel et al. | |
| 2017/0113140 A1 | 4/2017 | Blackstock et al. | |
| 2017/0118145 A1 | 4/2017 | Aittoniemi et al. | |
| 2017/0169617 A1 | 6/2017 | Rodriguez, II | |
| 2017/0199855 A1 | 7/2017 | Fishbeck | |
| 2017/0235848 A1 | 8/2017 | Van Dusen et al. | |
| 2017/0237789 A1* | 8/2017 | Harner | H04L 65/4015 709/205 |
| 2017/0310934 A1 | 10/2017 | Du et al. | |
| 2017/0312634 A1 | 11/2017 | Ledoux et al. | |
| 2018/0047200 A1 | 2/2018 | O'hara et al. | |
| 2018/0113587 A1 | 4/2018 | Allen et al. | |
| 2018/0115503 A1 | 4/2018 | Baldwin et al. | |
| 2018/0121762 A1 | 5/2018 | Han et al. | |
| 2018/0198743 A1 | 7/2018 | Blackstock et al. | |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2019/0001223 A1 | 1/2019 | Blackstock et al. | |
| 2019/0057616 A1 | 2/2019 | Cohen et al. | |
| 2019/0097958 A1 | 3/2019 | Collet et al. | |
| 2019/0107990 A1* | 4/2019 | Spivack | G06T 11/60 |
| 2019/0107991 A1* | 4/2019 | Spivack | G09G 5/14 |
| 2019/0188920 A1 | 6/2019 | Mcphee et al. | |
| 2019/0251752 A1 | 8/2019 | Rodriguez, II | |
| 2019/0280997 A1 | 9/2019 | Baldwin et al. | |
| 2019/0355181 A1* | 11/2019 | Srinivasan | G06F 3/04842 |
| 2020/0007906 A1* | 1/2020 | Chui | H04N 21/84 |
| 2020/0150435 A1 | 5/2020 | Rodriguez, II | |
| 2020/0218411 A1 | 7/2020 | Grantham et al. | |
| 2020/0219312 A1 | 7/2020 | Jurgenson et al. | |
| 2020/0234480 A1 | 7/2020 | Volkov et al. | |
| 2020/0306637 A1 | 10/2020 | Baldwin et al. | |
| 2020/0310601 A1 | 10/2020 | Anvaripour et al. | |
| 2020/0311426 A1 | 10/2020 | Charlton et al. | |
| 2020/0351353 A1 | 11/2020 | Al Majid et al. | |
| 2020/0356760 A1 | 11/2020 | Li et al. | |
| 2020/0372127 A1 | 11/2020 | Denton et al. | |
| 2020/0410575 A1 | 12/2020 | Grantham et al. | |
| 2020/0410764 A1 | 12/2020 | Cowburn et al. | |
| 2020/0410773 A1 | 12/2020 | Li et al. | |
| 2020/0412864 A1 | 12/2020 | Al Majid et al. | |
| 2020/0412975 A1 | 12/2020 | Al Majid et al. | |
| 2021/0041997 A1 | 2/2021 | Voss | |
| 2021/0056760 A1 | 2/2021 | Cowburn et al. | |
| 2021/0065448 A1 | 3/2021 | Goodrich et al. | |
| 2021/0065464 A1 | 3/2021 | Goodrich et al. | |
| 2021/0067756 A1 | 3/2021 | Goodrich et al. | |
| 2021/0067836 A1 | 3/2021 | Hornsby et al. | |
| 2021/0074047 A1 | 3/2021 | Sheth et al. | |
| 2021/0074069 A1 | 3/2021 | Charlton et al. | |
| 2021/0076173 A1 | 3/2021 | Monroy-Hernandez et al. | |
| 2021/0081088 A1 | 3/2021 | Voss | |
| 2021/0089179 A1 | 3/2021 | Grantham et al. | |
| 2021/0097245 A1 | 4/2021 | Monroy-Hernandez | |
| 2021/0097743 A1 | 4/2021 | Krishnan Gorumkonda et al. | |
| 2021/0097744 A1 | 4/2021 | Gorumkonda et al. | |
| 2021/0097745 A1 | 4/2021 | Monroy-Hernandez et al. | |
| 2021/0099551 A1 | 4/2021 | Cieslak et al. | |
| 2021/0099639 A1 | 4/2021 | Bartow et al. | |
| 2021/0103779 A1 | 4/2021 | Brody | |
| 2021/0104087 A1 | 4/2021 | Smith et al. | |
| 2021/0149190 A1 | 5/2021 | Johnson et al. | |
| 2021/0150719 A1 | 5/2021 | Cowburn et al. | |
| 2021/0165559 A1 | 6/2021 | Voss et al. | |
| 2021/0165998 A1 | 6/2021 | Cao et al. | |
| 2021/0168108 A1 | 6/2021 | Antmen et al. | |
| 2021/0170270 A1 | 6/2021 | Brody et al. | |
| 2021/0174600 A1 | 6/2021 | Hare et al. | |
| 2021/0192823 A1 | 6/2021 | Amitay et al. | |
| 2021/0200390 A1 | 7/2021 | Luo et al. | |
| 2021/0200426 A1 | 7/2021 | Al Majid et al. | |
| 2021/0200776 A1 | 7/2021 | Pounds et al. | |
| 2021/0201036 A1 | 7/2021 | Gupta et al. | |
| 2021/0201392 A1 | 7/2021 | Aghdaii et al. | |
| 2021/0203627 A1 | 7/2021 | Luo et al. | |
| 2021/0203628 A1 | 7/2021 | Luo et al. | |
| 2021/0209825 A1 | 7/2021 | Assouline et al. | |
| 2021/0225058 A1 | 7/2021 | Chand et al. | |

(56) References Cited

U.S. PATENT DOCUMENTS

| | | |
|---|---|---|
| 2021/0240315 A1 | 8/2021 | Alvi et al. |
| 2021/0240990 A1 | 8/2021 | Charlton et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0279082 A1 | 9/2021 | Wayne et al. |
| 2021/0279842 A1 | 9/2021 | Anilkumar et al. |
| 2021/0281897 A1 | 9/2021 | Brody et al. |
| 2021/0285774 A1 | 9/2021 | Collins et al. |
| 2021/0303075 A1 | 9/2021 | Cowburn et al. |
| 2021/0303110 A1 | 9/2021 | Giacalone et al. |
| 2021/0303140 A1 | 9/2021 | Mourkogiannis |
| 2021/0304505 A1 | 9/2021 | Anvaripour et al. |
| 2021/0304506 A1 | 9/2021 | Mourkogiannis et al. |
| 2021/0304629 A1 | 9/2021 | Barron et al. |
| 2021/0306290 A1 | 9/2021 | Voss |
| 2021/0306451 A1 | 9/2021 | Heikkinen et al. |
| 2021/0312523 A1 | 10/2021 | Luo et al. |
| 2021/0312533 A1 | 10/2021 | Luo et al. |
| 2021/0312672 A1 | 10/2021 | Luo et al. |
| 2021/0312678 A1 | 10/2021 | Luo et al. |
| 2021/0312682 A1 | 10/2021 | Krishnan Gorumkonda et al. |
| 2021/0312690 A1 | 10/2021 | Krishnan Gorumkonda et al. |
| 2021/0319540 A1 | 10/2021 | Cao et al. |
| 2021/0319625 A1 | 10/2021 | Goodrich et al. |
| 2021/0326635 A1 | 10/2021 | Cowburn et al. |
| 2021/0327117 A1 | 10/2021 | Krokhalev et al. |
| 2021/0334993 A1 | 10/2021 | Woodford |
| 2021/0335004 A1 | 10/2021 | Zohar et al. |
| 2021/0336908 A1 | 10/2021 | Taitz |
| 2021/0343050 A1 | 11/2021 | Li et al. |
| 2021/0357075 A1 | 11/2021 | Nayar et al. |
| 2021/0360056 A1 | 11/2021 | Baron et al. |
| 2021/0373726 A1 | 12/2021 | Boyd et al. |
| 2021/0373843 A1 | 12/2021 | Hornsby et al. |
| 2021/0382585 A1 | 12/2021 | Collins et al. |
| 2021/0382587 A1 | 12/2021 | Heikkinen et al. |
| 2021/0382616 A1 | 12/2021 | Gale et al. |
| 2021/0383373 A1 | 12/2021 | Eirinberg et al. |
| 2021/0385179 A1 | 12/2021 | Heikkinen et al. |
| 2021/0385180 A1 | 12/2021 | Al Majid et al. |
| 2021/0387090 A1 | 12/2021 | Eirinberg et al. |
| 2021/0387097 A1 | 12/2021 | Desserrey et al. |
| 2021/0389850 A1 | 12/2021 | Charlton et al. |
| 2021/0389851 A1 | 12/2021 | Al Majid et al. |
| 2021/0389852 A1 | 12/2021 | Desserrey et al. |
| 2021/0389932 A1 | 12/2021 | Mandia |
| 2021/0390729 A1 | 12/2021 | Fox-roberts et al. |
| 2021/0390745 A1 | 12/2021 | Rykhliuk et al. |
| 2021/0390784 A1 | 12/2021 | Smith et al. |
| 2021/0392097 A1 | 12/2021 | Ahmed et al. |
| 2021/0392098 A1 | 12/2021 | Gorkin et al. |
| 2021/0392141 A1 | 12/2021 | Mandia |
| 2021/0392459 A1 | 12/2021 | Gorkin et al. |
| 2021/0392460 A1 | 12/2021 | Gorkin et al. |
| 2021/0404831 A1 | 12/2021 | Drummond et al. |
| 2021/0405831 A1 | 12/2021 | Mourkogiannis et al. |
| 2021/0405832 A1 | 12/2021 | Brown et al. |
| 2021/0406447 A1 | 12/2021 | Hermann et al. |
| 2021/0406543 A1 | 12/2021 | Drummond et al. |
| 2021/0406965 A1 | 12/2021 | Anvaripour et al. |
| 2021/0407163 A1 | 12/2021 | Chai et al. |
| 2021/0407506 A1 | 12/2021 | Drummond et al. |
| 2021/0407533 A1 | 12/2021 | Cowburn et al. |
| 2021/0409356 A1 | 12/2021 | Luo et al. |
| 2021/0409502 A1 | 12/2021 | Chepizhenko et al. |
| 2021/0409517 A1 | 12/2021 | Luo et al. |
| 2021/0409535 A1 | 12/2021 | Mourkogiannis et al. |
| 2021/0409610 A1 | 12/2021 | Mandia et al. |
| 2021/0409612 A1 | 12/2021 | Mandia et al. |
| 2021/0409616 A1 | 12/2021 | Chan et al. |
| 2022/0012929 A1 | 1/2022 | Blackstock et al. |
| 2022/0019640 A1 | 1/2022 | Hermann et al. |
| 2022/0020194 A1 | 1/2022 | Luo et al. |
| 2022/0053146 A1 | 2/2022 | Alavi et al. |
| 2022/0070129 A1 | 3/2022 | Boyd et al. |
| 2022/0075591 A1 | 3/2022 | Cardenas Gasca et al. |
| 2022/0075819 A1 | 3/2022 | Boyd et al. |
| 2022/0076017 A1 | 3/2022 | Cowburn et al. |
| 2022/0076492 A1 | 3/2022 | Smith et al. |
| 2022/0076497 A1 | 3/2022 | Goodrich et al. |
| 2022/0076500 A1 | 3/2022 | Goodrich et al. |
| 2022/0076504 A1 | 3/2022 | Goodrich et al. |
| 2022/0078143 A1 | 3/2022 | Eirinberg et al. |
| 2022/0083737 A1 | 3/2022 | Apanovych et al. |
| 2022/0084295 A1 | 3/2022 | Smith et al. |
| 2022/0086111 A1 | 3/2022 | Smith et al. |
| 2022/0086235 A1 | 3/2022 | Al Majid et al. |
| 2022/0086367 A1 | 3/2022 | Boyd et al. |
| 2022/0214743 A1* | 7/2022 | Dascola .......... G06F 3/012 |
| 2022/0308735 A1* | 9/2022 | Appelbaum ........ H04L 65/1069 |
| 2023/0186521 A1 | 6/2023 | Micusik et al. |

FOREIGN PATENT DOCUMENTS

| | | |
|---|---|---|
| CN | 110168478 A | 8/2019 |
| CN | 113348650 A | 9/2021 |
| CN | 113631886 A | 11/2021 |
| CN | 113966525 A | 1/2022 |
| CN | 114008577 A | 2/2022 |
| CN | 114041104 A | 2/2022 |
| CN | 114080628 A | 2/2022 |
| CN | 114207567 A | 3/2022 |
| EP | 2184092 A2 | 5/2010 |
| EP | 3566113 B1 | 2/2021 |
| EP | 3857496 A1 | 8/2021 |
| EP | 3901951 A1 | 10/2021 |
| EP | 3948582 A1 | 2/2022 |
| EP | 3677056 B1 | 3/2022 |
| JP | 2001230801 A | 8/2001 |
| JP | 5497931 B2 | 3/2014 |
| KR | 101445263 B1 | 9/2014 |
| KR | 20190105638 A | 9/2019 |
| KR | 20200037435 A | 4/2020 |
| KR | 20210031768 A | 3/2021 |
| KR | 20210039496 A | 4/2021 |
| KR | 20210046760 A | 4/2021 |
| KR | 20210099624 A | 8/2021 |
| KR | 20210103525 A | 8/2021 |
| KR | 20210123357 A | 10/2021 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013085639 A1 | 6/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2017031389 A1 | 2/2017 |
| WO | WO-2018081013 A1 | 5/2018 |
| WO | WO-2018102562 A1 | 6/2018 |
| WO | WO-2018129531 A1 | 7/2018 |
| WO | WO-2018200043 A1 | 11/2018 |
| WO | WO-2019089613 A1 | 5/2019 |
| WO | WO-2019204464 A1 | 10/2019 |
| WO | WO-2020047261 A1 | 3/2020 |
| WO | WO-2020150689 A1 | 7/2020 |
| WO | WO-2020160261 A1 | 8/2020 |
| WO | WO-2020205435 A1 | 10/2020 |
| WO | WO-2021030841 A1 | 2/2021 |
| WO | WO-2021042134 A1 | 3/2021 |
| WO | WO-2021046582 A1 | 3/2021 |
| WO | WO-2021051131 A1 | 3/2021 |
| WO | WO-2021067988 A1 | 4/2021 |
| WO | WO-2021126864 A1 | 6/2021 |
| WO | WO-2021133942 A1 | 7/2021 |
| WO | WO-2021138161 A1 | 7/2021 |
| WO | WO-2021138630 A1 | 7/2021 |
| WO | WO-2021158768 A1 | 8/2021 |
| WO | WO-2021163725 A1 | 8/2021 |

(56) References Cited

FOREIGN PATENT DOCUMENTS

| | | |
|---|---|---|
| WO | WO-2021194855 A1 | 9/2021 |
| WO | WO-2021195670 A1 | 9/2021 |
| WO | WO-2021202191 A1 | 10/2021 |
| WO | WO-2021203118 A1 | 10/2021 |
| WO | WO-2021203119 A1 | 10/2021 |
| WO | WO-2021203134 A1 | 10/2021 |
| WO | WO-2021211851 A1 | 10/2021 |
| WO | WO-2021216999 A1 | 10/2021 |
| WO | WO-2021217167 A1 | 10/2021 |
| WO | WO-2021222198 A1 | 11/2021 |
| WO | WO-2021226341 A1 | 11/2021 |
| WO | WO-2021237088 A1 | 11/2021 |
| WO | WO-2021242765 A1 | 12/2021 |
| WO | WO-2021252201 A2 | 12/2021 |
| WO | WO-2021252217 A1 | 12/2021 |
| WO | WO-2021252218 A1 | 12/2021 |
| WO | WO-2021252233 A1 | 12/2021 |
| WO | WO-2021252237 A1 | 12/2021 |
| WO | WO-2021252256 A1 | 12/2021 |
| WO | WO-2021252386 A1 | 12/2021 |
| WO | WO-2021252763 A1 | 12/2021 |
| WO | WO-2021257401 A1 | 12/2021 |
| WO | WO-2021257619 A1 | 12/2021 |
| WO | WO-2021263210 A1 | 12/2021 |
| WO | WO-2022005715 A1 | 1/2022 |
| WO | WO-2022005717 A1 | 1/2022 |
| WO | WO-2022005794 A1 | 1/2022 |
| WO | WO-2022005838 A1 | 1/2022 |
| WO | WO-2022005841 A1 | 1/2022 |
| WO | WO-2022005843 A1 | 1/2022 |
| WO | WO-2022005845 A1 | 1/2022 |
| WO | WO-2022006170 A1 | 1/2022 |
| WO | WO-2022006249 A1 | 1/2022 |
| WO | WO-2022006279 A1 | 1/2022 |
| WO | WO-2022006289 A1 | 1/2022 |
| WO | WO-2022006318 A1 | 1/2022 |
| WO | WO-2022015865 A1 | 1/2022 |
| WO | WO-2022047463 A1 | 3/2022 |
| WO | WO-2022047477 A1 | 3/2022 |
| WO | WO-2022055992 A1 | 3/2022 |
| WO | WO-2022056118 A1 | 3/2022 |
| WO | WO-2022056132 A2 | 3/2022 |
| WO | 2023212499 | 11/2023 |

OTHER PUBLICATIONS

"International Application Serial No. PCT/US2023/065988, Written Opinion mailed Sep. 12, 2023", 5 pgs.
Micusik, Branislav, "Ego-Motion Alignment from Face Detections for Collaborative Augmented Reality", [Online] Retrieved from the Internet: <URL: https://arxiv.org/abs/2010.02153v1>, (Oct. 5, 2020), 25 pgs.
Nakamura, N., "Distributed Virtual Reality System For Cooperative Work, NEC Research And Development", Nippon Electric Ltd. Tokyo, JP, vol. 35, No. 4, (Oct. 1, 1994), 403-409.
"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.
"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.
"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.
"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.
"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.
"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.
"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.
Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.
Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.
Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.
Macmillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.
Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.
Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.
Reign, Ashley, "How to Add My Friend's Bitmoji to My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.
Tumbokon, Karen, "Snapchat Update: How to Add Bitmoji to Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.
"International Application Serial No. PCT/US2023/065988, International Preliminary Report on Patentability mailed Nov. 7, 2024", 7 pgs.
"International Application Serial No. PCT/US2024/037197, International Search Report mailed Oct. 23, 2024", 4 pgs.
"International Application Serial No. PCT/US2024/037197, Written Opinion mailed Oct. 23, 2024", 6 pgs.

\* cited by examiner

REAL-TIME MODIFICATIONS IN AUGMENTED REALITY EXPERIENCES

TECHNICAL FIELD

The present disclosure relates generally to generating augmented reality (AR) experiences on messaging applications.

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
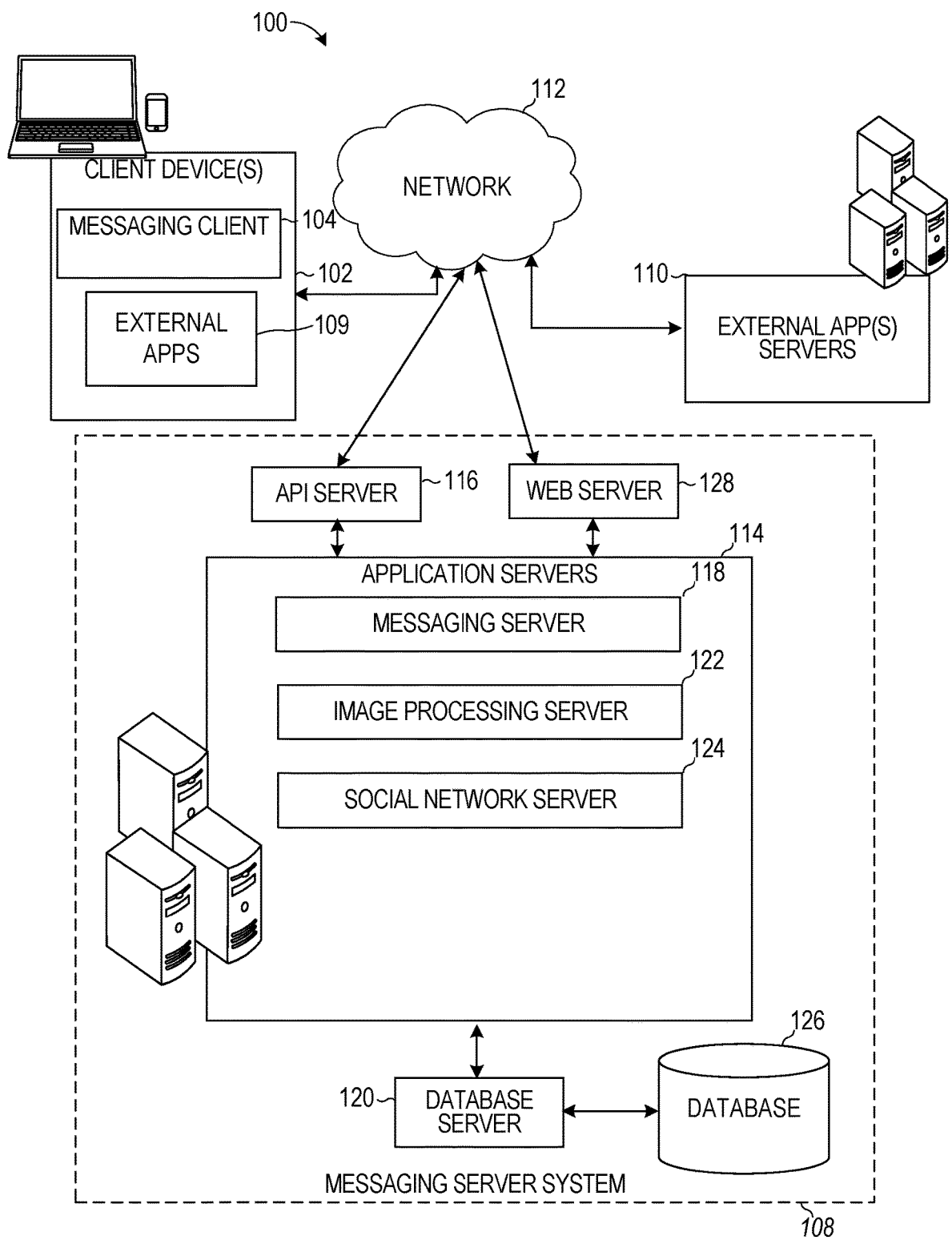
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Messaging applications typically enable end users to access various shared AR experiences by launching an AR experience bundle or package that includes the AR content associated with the shard AR experiences. The shared AR experiences allow multiple users to simultaneously interact with the same shared AR experience together on their respective devices. These shared AR experiences typically present AR elements that can be modified in some manner by the users. For example, in a shared AR experience such as a game, users may be able to move the position of AR elements depicting players, balls, or other items to facilitate gameplay. Synchronizing modifications made to these types of AR elements at a high speed can be essential to providing a smooth and functional shared AR experience between the users. For example, in an AR game in which users hit a ball back and forth, the movement and location of the ball should be synchronized at a high speed to allow each user to properly react to the movement and attempt to hit the ball back to the other user. Latency in synchronizing these modifications may therefore result in an unacceptable lag in presentation of the AR elements that ultimately ruins the shared AR experience.

Synchronizing data at a high speed, however, can be difficult due to the constraints of available computing and network bandwidth. This may be particularly difficult when providing a shared AR experience using smaller and/or wireless devices. As a result, AR experience developers may have to limit the score of the shared AR experiences they develop to avoid unwanted latency when synchronizing these AR elements.

The disclosed techniques solve these technical issues by enabling developers to designate a subset of AR elements within to a shared AR experience to be synchronized in real time. For example, an AR development platform can be provided, which presents a user interface to the AR experience developer to enable the AR developer to select which AR elements can be modified by users and should be synchronized in real time. The user interface may also enable the developers to specify conditions that need to be met in order to allow for such real-time modifications to take place. This allows developers to limit the amount of data that is synchronized during user of the shared AR experience, thereby providing the developer a greater amount of flexibility to create useful, interesting and engaging shared AR experiences without being restricted by the resource constraints of the messaging applications and/or client devices that run the AR experiences.

In some examples, the disclosed techniques generate an entity or resource that shares updates or modifications made to an AR element over a real-time connection. An AR element that is part of an AR experience which has been specified as needing to be synchronized in real time can be associated with the generated entity. As one client device 102 performs changes or modifications with respect to the AR element, those changes are stored in the entity and immediately are shared with other client devices 102 that are involved in the shared AR experience. Namely, any changes or modifications made to the entity or resource are broadcast to other client devices 102 that are engaged in the AR experience over a real-time connection. This results in updates made to the AR element being reflected instantaneously which reduces lag associated with the AR element.

Other AR elements that may not need to be updated in real-time can be modified and such modifications can be exchanged over lower bandwidth connections. This improves the overall user experience and reduces the amount of resources consumed by the AR experience.

This improves the efficiency of using the electronic device and the overall AR experience of the users in using the electronic device. Also, by selectively exchanging modifications of some AR elements across devices over real-time connections while exchanging modifications to other AR elements over low bandwidth connections, bandwidth consumption of the AR experience is reduced as well as the overall amount of system resources needed to accomplish a task is reduced.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications, such as external apps 109, using Application Programming Interfaces (APIs).

The client device 102 may operate as a standalone device or may be coupled (e.g., networked) to other machines. In a networked deployment, the client device 102 may operate in the capacity of a server machine or a client machine in a server-client network environment, or as a peer machine in a peer-to-peer (or distributed) network environment. The client device 102 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the disclosed operations. Further, while only a single client device 102 is illustrated, the term "client device" shall also be taken to include a collection of machines that individually or jointly execute the disclosed operations.

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

In some examples, the client device 102 can be operated by an AR experience developer. In such cases, the AR experience developer (or AR developer) accesses an AR experience development platform. The AR experience development platform allows the AR developer to generate an AR experience bundle that includes a set of AR elements. The AR developer can specify which subset of AR elements can be synchronized in real time over a real time connection, such as via a real-time entity or resource. The AR developer can also specify conditions under which the set of AR elements or a portion of the set of AR elements are enabled for exclusive access to perform real-time modifications and/or are enabled to have associated modifications exchanged over a real-time connection. The conditions can include, for example, a threshold location or position of the associated AR elements that cause control over performing modifications to the associated AR elements to transition from one client device 102 to another. In some examples, another subset of AR elements that are not selected to be synchronized over the real-time connection can be updated or synchronized over a lower bandwidth connection or not at all.

AR elements that are enabled for performing real-time modifications can be associated with real-time entities that propagate changes made by one client device 102 to another. The changes can be propagated or broadcast over a real time connection so that the changes are instantly available to each of the client devices 102 involved in the shared AR experience. Namely, changes associated with AR elements that are present in the real-time entity can be reflected by recipient client devices 102 faster than changes made or associated with other AR elements that are not exchanged via the real time entity and are exchanged over lower bandwidth connections. Specifically, a plurality of client devices 102 can be engaged in a shared AR experience. During the shared AR experience, a first client device 102 can request to perform real-time modifications or interactions with a particular AR element. If the conditions for performing real-time modifications that are associated with the AR element are satisfied by the first client device 102 (e.g., an AR ball has crossed a threshold position that transfers control over the AR element to the first client device 102), the first client device 102 can obtain access to the real-time entity associated with the particular AR element. The first client device 102 can attempt to obtain exclusive access to the entity by determining if the entity is in a locked or unlocked state.

The first client device 102 can store or change the state of the entity to the locked state if the entity is currently in an unlocked state to prevent a second client device 102 from concurrently requesting/performing real-time modifications to the particular AR element. At this point, the first client device 102 can receive modifications to the particular AR element (e.g., modifying a display position or orientation and/or a display characteristics). In response to receiving the modifications, the first client device 102 updates data stored in the entity associated with the particular AR element to represent the modifications and causes the data or changes to the data stored in the entity to be propagated or broadcast or sent to the second client device 102 over a real-time connection. Changes made to other AR elements (e.g., an AR scoreboard) can continue to be sent or exchanged over a lower bandwidth connection. The second client device 102 receives the updated entity and applies the modifications indicated by the entity to the particular AR element presented by the second client device 102. In this way, the first and second client devices 102 can present modifications to the particular AR element performed by the first client device 102 in real time, such that neither device experiences any delay or lag in presenting modifications to the particular AR element.

In some examples, the conditions can include geographical locations, levels in a gaming application or AR experience, a type of gaming application, views or depictions of real-world environment portions, time, location markers, image markers, account credentials, access rights, and/or any other suitable condition. In some examples, the contextual and/or location data can include at least one of a latitude and longitude of a real-world object, global positioning system (GPS) coordinates of the real-world object, a bounding box associated with the real-world object, an object type of the real-world object, or a three-dimensional (3D) match of the real-world object.

In some examples, one or more conditions can be used to transfer control over modifications applied to a given AR element from one user to another user. For example, the condition can specify a threshold location or range of locations. When the AR element has crossed or transgressed the specified threshold location or range of locations, the control to manipulate the AR element can transfer from one user to the other. The transfer of control allows the client device 102 of the user who has control to perform modifications to values or locations associated with the AR element and share those modifications in real time while preventing other users from performing such modifications. Also, the modifications to the values or locations associated with the AR element can be sent over a higher bandwidth link or connection or prioritized for real-time exchange over other AR elements that may be present in the AR experience. As an example, control to manipulate an AR element representing an AR ball may transfer between users when the AR ball has crossed a certain threshold, such as the AR net in an AR ping pong or AR tennis game, or a midway point. This location can be represented by values or data associated with the AR element.

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Programming Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
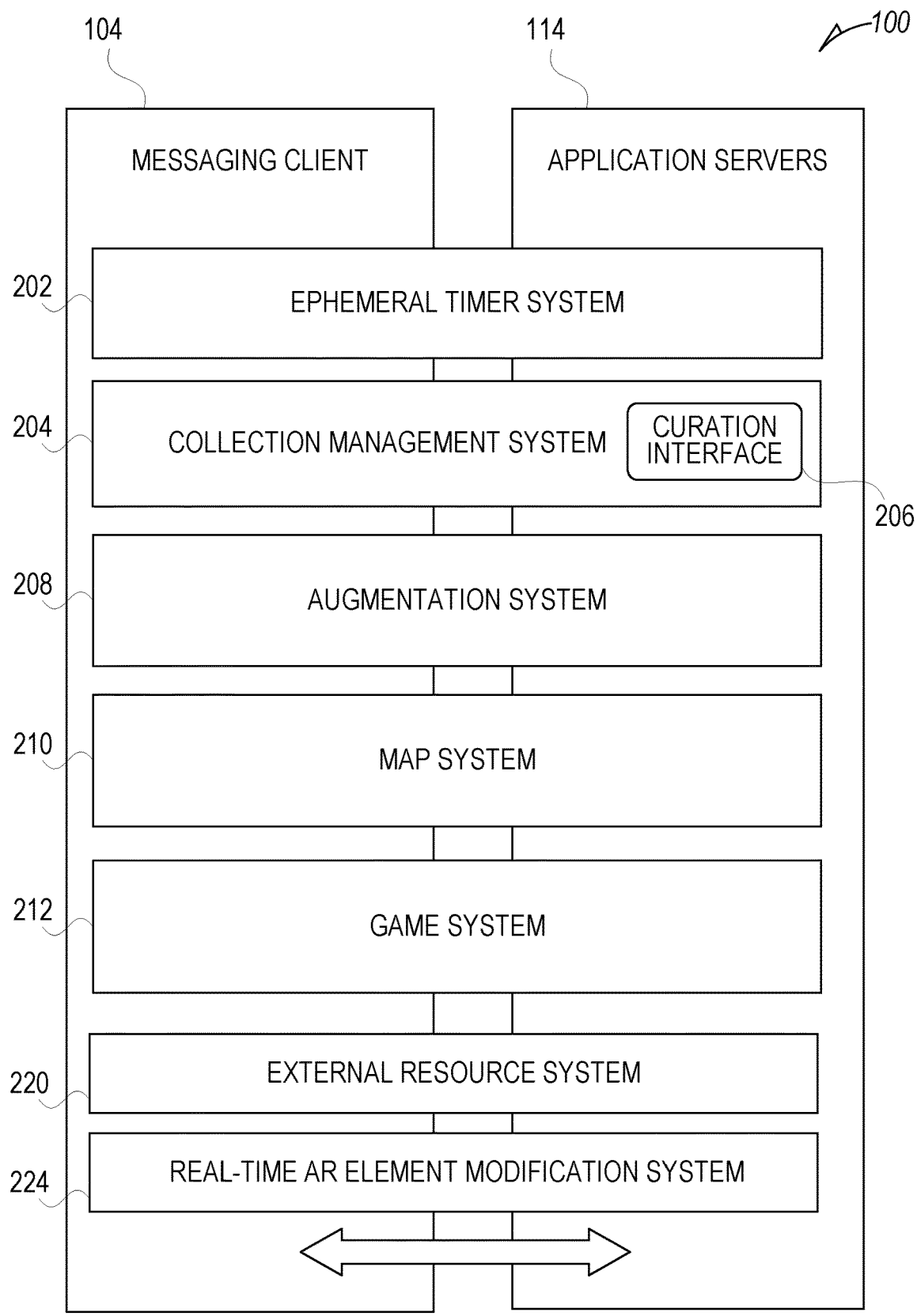
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more augmented reality experiences on a client device 102 when an image is captured by the client device 102. Specifically, the messaging client 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience or perform a desired image modification (e.g., replacing a garment being worn by a user in a video or recoloring the garment worn by the user in the video or modifying the garment based on a gesture performed by the user).

Figure 3:
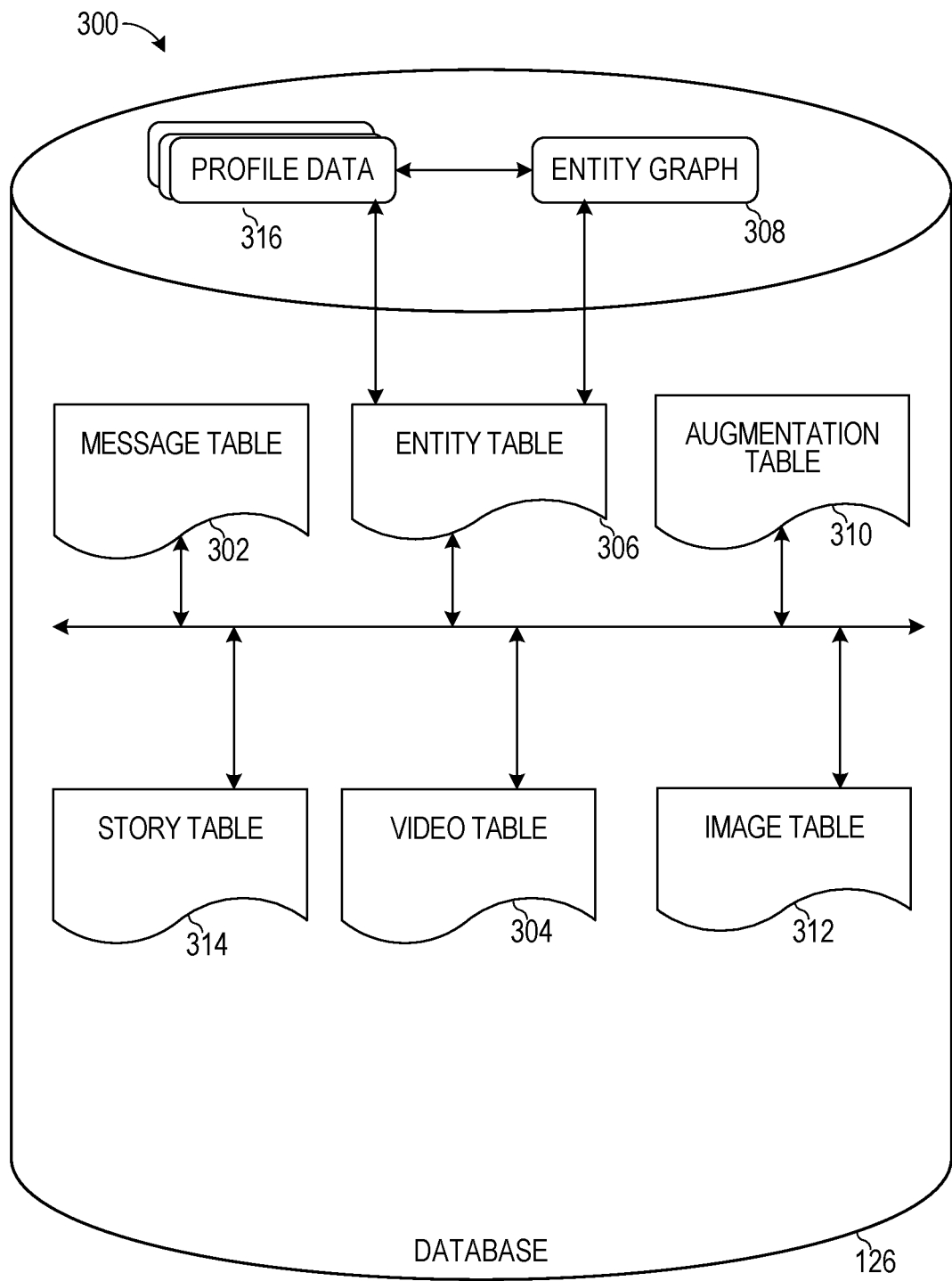
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

The messaging client 104 can allow users to establish a shared AR experience across a plurality of client devices 102. The messaging client 104 can receive, from a first client device 102 of the plurality of client devices 102, a request to perform a real-time interaction with a given AR element that is presented on displays of the plurality of client devices. In response to receiving the request, the messaging client 104 enables the first client device 102 to perform one or more modifications to the given AR element while preventing a second of the plurality of client devices 102 from performing real-time interactions with the given AR element. The messaging client 104 can first determine whether the given AR element has been designed by an AR developer as being enabled for synchronizing modifications in real time. The messaging client 104 can also access a set of conditions associated with the given AR element to determine whether to transfer control to the first client device 102 or enable the first client device 102 to perform modifications to the given AR element.

In response to determining that the given AR element is enabled for real-time modification synchronization and that the set of conditions associated with the given AR element are satisfied by the first client device 102, the messaging client 104 enables the first client device 102 to store or update data stored in a real-time entity or resource associated with the given AR element. The messaging client 104 synchronizes the one or more modifications of the given AR element performed by the first client device 102 across each of the plurality of client devices 102 in real time, such as via the real-time entity associated with the given AR element over a real-time connection. An entity, as referred to herein, includes a data structure or element that is configured to represent real-time changes and is configured to exchange such real-time changes across a plurality of client devices 102 over a high bandwidth link (e.g., a real time connection). The real-time changes are broadcast from one client device 102 to each of the other client devices 102 that are engaged in the shared AR experience.

In some examples, modifications made to the given AR element can be exchanged or transmitted over a higher bandwidth connection (e.g., over a real-time link) to the other client devices 102 while modifications associated with other AR elements are exchanged over a lower bandwidth connection (e.g., over a non-real time link). This can result in a consistent and synchronized presentation of the AR experience and associated AR elements of the AR experience across client devices 102 on which the AR experience is accessed while reducing the overall bandwidth consumed by the AR experience. Namely, by limiting the amount of data that needs to be exchanged in real-time to the modifications made to a subset of the AR elements, the amount of bandwidth consumed by the AR experience is reduced which reduces the overall amount of resources that are used up by the AR experience. This can reduce lag and improve the overall user experience.

In some examples, the messaging client 104 can present an AR developer interface. In such cases, the messaging client 104 can be operated by an AR developer to develop and create one or more AR experiences, as discussed below. The AR developer interface enables a developer to specify which AR elements (e.g., an AR moving ball and AR paddles) need to be synchronized in real-time and which AR elements (e.g., scoreboard) can be synchronized over a lower bandwidth connection. The AR developer can also specify or input conditions under which client devices 102 can perform modifications the AR element, such as a threshold or barrier in the AR experience that transitions control over performing modifications to the AR element from one client device 102 to another client device 102.

For example, if there is a virtual AR pong type game, then the movement of the AR puck and the AR paddles needs to be updated in real-time to provide for a smooth and playable shared AR experience. In contrast, other AR elements in the game may not need to be synchronized as quickly or at all. Bandwidth is always an issue when synchronizing data across devices, so the disclosed examples provide a solution that allows AR experience developers to designate those particular AR elements that need to be synchronized at a higher speed or over a real time high bandwidth connection. For example, an AR developer can designate the AR puck and AR paddles in the AR pong game as being AR elements that need to be synchronized in real time (e.g., using a real-time entity), while other AR elements, such as background AR elements, the scoreboard, etc. are not synchronized in real time (or synchronized over a different lower bandwidth connection). This limits the amount of data that is synchronized in real-time to just a subset of AR data that is needed to facilitate a smooth shared AR experience. Limiting the amount of data that is synchronized in real time reduces computing resource usage and, thereby improves synchronization performance.

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions) as well as other payload data (e.g., text, audio, video or other multimedia data), such as during a video call between a plurality of users or participants.

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging, video call, group video call, and so forth) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions, and supports the presentation of map-based media content and messages by the messaging client 104. For example, the map system 210 enables the display of user icons or avatars (e.g., stored in profile data 316, shown in FIG. 3) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The real-time AR element modification system 224 can establish a shared AR experience across a plurality of client devices. The real-time AR element modification system 224 can receive, from a first client device 102 of the plurality of client devices 102, a request to perform a real-time interaction with a given AR element that is presented on displays of the plurality of client devices 102. The real-time AR element modification system 224, in response to receiving the request, can enable the first client device 102 to perform one or more modifications to the given AR element while preventing a second of the plurality of client devices 102 from performing real-time interactions with the given AR element. In some cases, the real-time AR element modification system 224 enables the first client device 102 to perform the real-time modifications in response to determining that a set of conditions associated with the given AR element are satisfied and that real-time modification synchronization has been enabled for the given AR element. The real-time AR element modification system 224 can synchronize the one or more modifications of the given AR element performed by the first client device across each of the plurality of client devices in real time, such as via a real-time entity or resource associated with the given AR element. Data can be stored in the real-time entity or resource and updated by the first client device 102. The updated data can be broadcast to the second client device 102 over a high bandwidth real-time connection. Other modifications made to other AR elements for which real-time modification synchronization has not been enabled can be exchanged by the client devices 102 over a lower bandwidth connection (e.g., a non-real-time connection).

The real-time AR element modification system 224 can allow AR developers to create AR experiences with AR elements or assets that are modified in real time. The AR elements can include any combination of a 3D mesh object, a two-dimensional (2D) mesh, a machine learning model, a graphical element, an avatar, a sound, or a video. The real-time AR element modification system 224 can present a user interface of an AR developer platform. The user interface can be used to select which AR elements are to be enabled for real-time modification synchronization and which other AR elements are not enabled for real-time modification synchronization. The graphical user interface presents a list of AR elements associated with the AR experience and includes a first option associated with a first AR element of the list of AR elements to enable the first AR element for real-time modifications. The graphical user interface can include an option to specify one or more conditions for synchronizing changes or modifications of the first AR element, such as based on a geographical location, access rights, and/or threshold location or position on a display of the AR experience.

The graphical user interface also includes a second option associated with a second AR element of the list of AR elements to prevent real-time modifications. In some examples, the second AR element can be modified independently of the first AR element by a particular client device 102. Any changes made to the second AR element made by the first client device 102 may not be propagated or synchronized to/across other client devices 102 over the real-time connection or are synchronized over a lower bandwidth connection.

This provides a greater amount of flexibility for a developer to create useful, interesting and engaging AR experiences without being restricted by the resource constraints of the messaging applications and/or client devices that run the AR experiences.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a username, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, AR logos or emblems, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
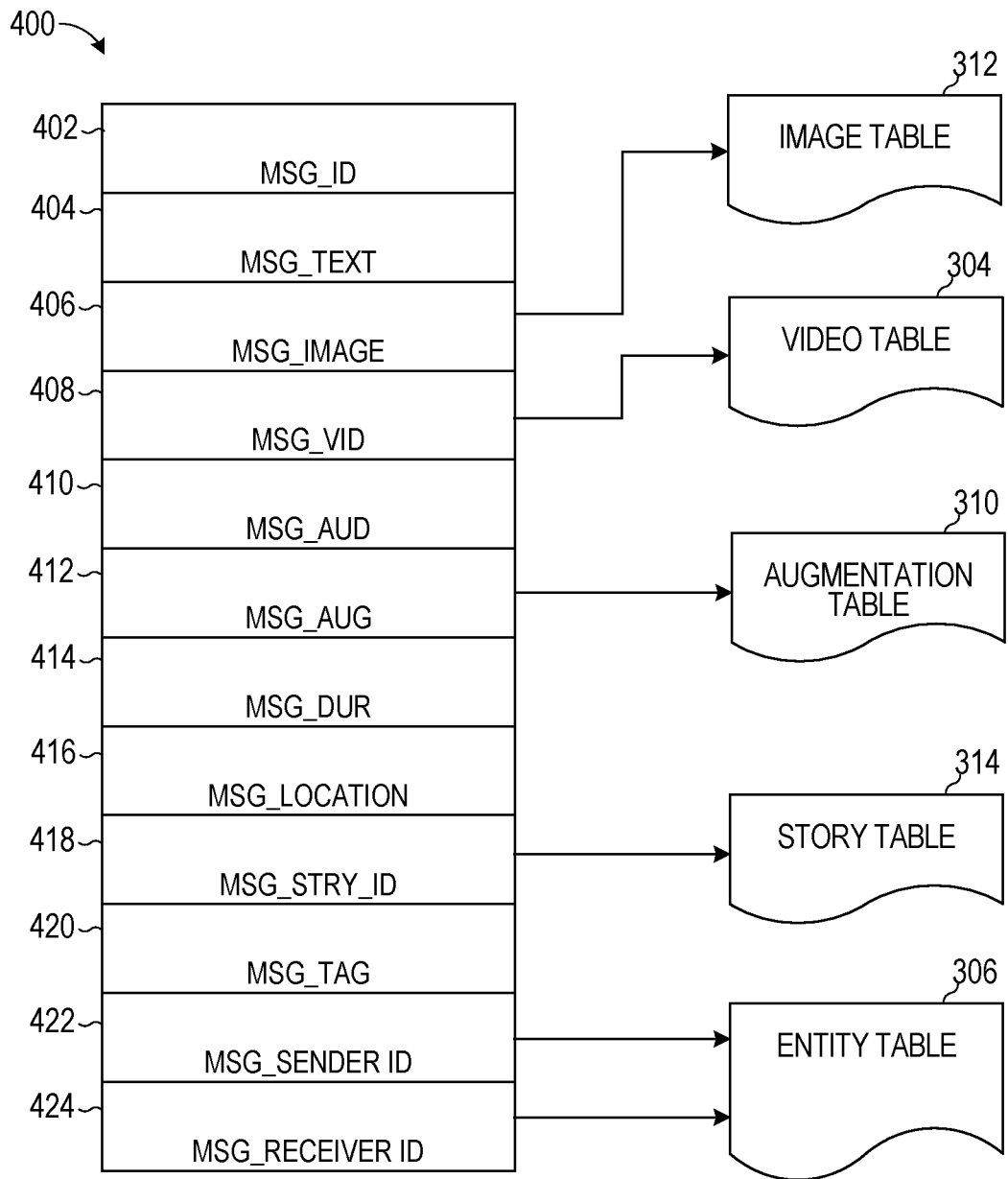
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Real-Time AR Element Modification System

Figure 5:
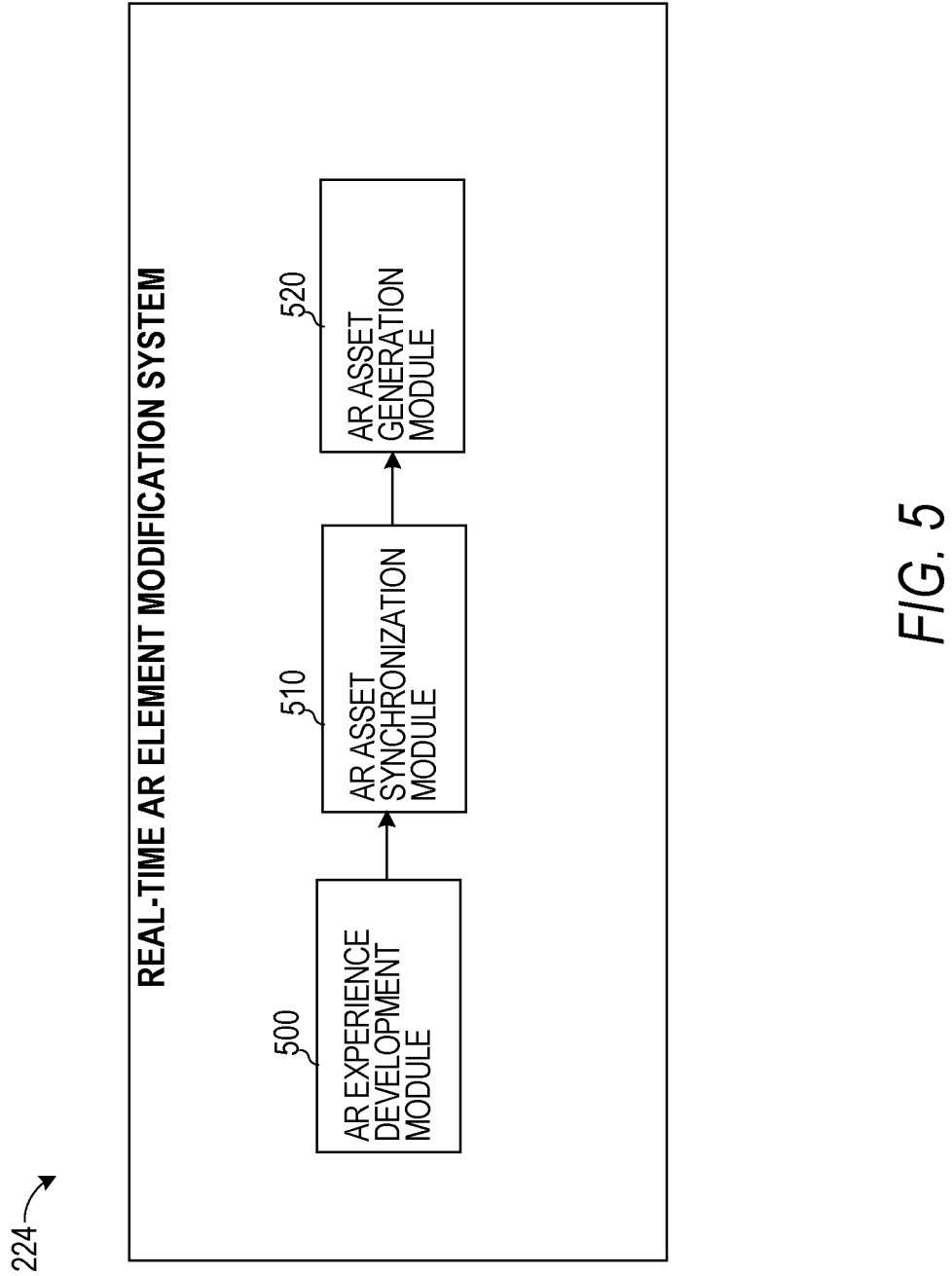
FIG. 5 is a block diagram showing an example real-time AR element modification system, according to some examples.

FIG. 5 is a block diagram showing an example real-time AR element modification system 224, according to some examples. The real-time AR element modification system 224 includes an AR experience development module 500, an AR asset synchronization module 510, and an AR asset generation module 520.

The AR experience development module 500 can generate user interfaces for presentation to an AR developer on an AR developer client device 102. The user interfaces can enable the AR developer to select AR elements for which to enable real-time modifications or interactions to be synchronized across a plurality of client devices 102. The user interfaces can enable the AR developer to select a different subset of AR elements for which modifications are synchronized over a non-real-time connection or over a lower bandwidth connection than those that are synchronized in real time. The user interfaces can enable the AR developer to specify one or more conditions or a set of conditions to enable certain client devices 102 to perform real-time modifications for those AR elements that are enabled for real-time modification synchronization.

The AR asset synchronization module 510 can generate user interfaces for presentation to end users on respective client devices 102. The user interfaces can enable the client devices 102 of the end users to access and load AR elements of a selected shared AR experience and to interact with such AR elements by modifying display attributes of the AR elements (e.g., changing their context) and/or modifying or anchoring the AR elements to a particular display position. The user interfaces can enable a first client device 102 to request to perform real-time modifications or interactions with a given AR element. The first client device 102 can access configuration data associated with the shared AR experience to determine whether the given AR element has been enabled for synchronizing modifications in real-time. If so, the first client device 102 can access the configuration data to determine whether the given AR element is associated with one or more conditions for enabling modifications to be synchronized in real time. In response to determining that the given AR element is enabled for real-time modification synchronization and that the one or more conditions (if any are present) are satisfied by the first client device 102, the first client device 102 can access a real-time entity associated with the given AR element.

The first client device 102 can determine if the real-time entity indicates that the given AR element is unlocked (e.g., another client device 102 is not currently performing real-time modifications to the given AR element). In such cases, the first client device 102 can enable a user to perform the requested modifications in real time. The first client device 102 stores changes or modifications to the given AR element in the real time entity and causes the entity to immediately broadcast and propagate any changes or modifications made by the first client device 102 to one or more other client devices 102 that are included in the shared AR experience over a real-time high bandwidth connection or link. This causes changes performed with respect to the AR element to be synchronized with the same context and/or at the same particular display position across a plurality of client devices 102. Other AR elements that are not being modified in real-time (e.g., an AR scoreboard which has been designated by the AR developer to be updated in non-real time) can have associated modifications or changes synchronized over a lower bandwidth connection across the client devices 102 engaged in the AR experience.

As referred to herein, an "AR experience bundle" or "AR bundle" represents a set of AR elements (including standard AR elements and linked AR elements) and corresponding configuration data and code that indicates the visual appearance, interaction and behavior of each of the AR elements.

The AR bundle includes the code necessary for a client device 102 to launch and execute the AR experience associated with the AR bundle. The configuration data can specify which AR elements are enabled for real-time modifications, which AR elements are disabled for real-time modifications, and/or one or more conditions for enabling a client device to perform real-time changes to the AR elements.

In some examples, the AR experience development module 500 receives a request from a developer client device 102 to access a developer user interface. The AR experience development module 500 can receive login credentials from the developer client device 102. The AR experience development module 500 can search for an account associated with the login credentials and can generate a graphical user interface associated with the account for presentation to the developer client device 102. The AR experience development module 500 can present in the graphical user interface a plurality of AR experience bundles associated with the account. In some cases, the account is accessible to an organization, in which case multiple users within the organization can share access to the account and can view the same set of AR experience bundles.

Figure 6:
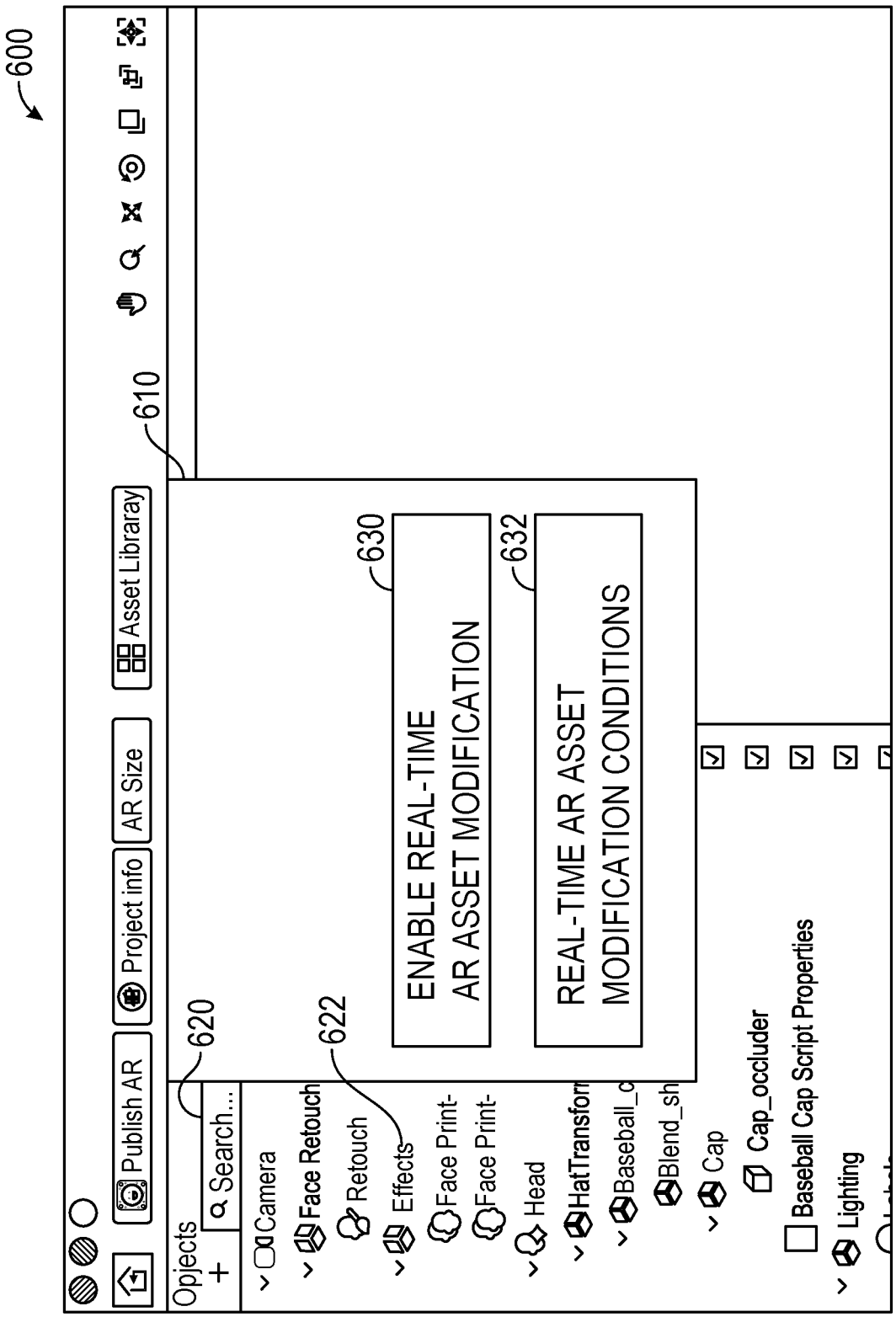
FIGS. 6-8 are diagrammatic representations of outputs of the real-time AR element modification system, in accordance with some examples.

The AR experience development module 500 can receive input from the developer client device 102 that selects a given AR experience bundle. In response to receiving the input, the AR experience development module 500 can present a graphical user interface 600 (FIG. 6). The AR experience development module 500 can include in the graphical user interface 600 an identifier of the AR experience bundle and a list of AR objects or AR elements 620 that are included in the AR experience bundle. The elements can include 2D meshes, 3D meshes, videos, audio files, image files, avatars, graphical elements, and/or machine learning models. The AR experience development module 500 can receive input that selects a given AR element 622 of the AR objects or AR elements 620.

In response, the AR experience development module 500 presents a prompt 610 that lists options enabling real-time AR asset modifications for the given AR element 622. The prompt 610 can include one or more fields for inputting one or more conditions 632 for enabling the real-time AR asset modifications to the given AR element 622. For example, the conditions can specify a level of subscription of an end user, a geographical region associated with the end user, a time of day, a type of AR experience, geographical locations, levels in a gaming application or AR experience, views or depictions of real-world environment portions, a request from an end user to enable real-time modifications to the AR object or element, time, location markers, image markers, or any other suitable condition. The conditions can also include a selected threshold display position or location for which access to performing real-time modifications for the given AR element 622 transfers to another client device 102. In such cases, the entity automatically enters the locked state for the first client device 102, preventing the first client device 102 from making further modifications to the given AR element 622 and becomes locked by the second client device 102 to enable the second client device 102 to perform real-time modifications. The prompt can also include an enable real-time AR asset modification option 630.

In some examples, one or more conditions include a linked set of AR experiences. The linked set of AR experiences identify different AR experiences using respective identifiers. The linked set of AR experiences can be configured to share entities or entity data associated with certain AR elements. Namely, a first AR experience can generate a first set of entity data associated with a given AR object or element. Thereafter, a second AR experience can be launched which can be determined to be on the same linked set of AR experiences as the first AR experience. This may mean that the two AR experiences share at least one AR element or object. In such cases, the second AR experience can obtain the first set of entity data generated using the first AR experience. The second AR experience can then use that first set of entity data to control and display the positioning of, visual and/or contextual information of the AR elements or objects displayed by the second AR experience. This allows users to perform real-time modifications to certain AR elements across different AR experiences.

For example, a first client device 102 can launch the first AR experience. A second client device 102 can launch a different second AR experience which can be linked to the first AR experience. The first client device 102 can receive a request to modify a given AR element presented by the first AR experience. The first client device 102 determines that the given AR element is associated with an entity and is enabled for performing real-time modifications or interactions. The first client device 102 can receive a set of modifications made to the given AR element and automatically update the entity associated with the given AR element. In real time, the entity broadcasts or propagates changes made in the entity with all other AR experiences that are linked to the same given AR element over a high bandwidth real-time connection. Specifically, the second client device 102 presents the same given AR element and represents the modifications indicated by the entity in real time on the second AR experience as such changes are being made by the first client device 102. The second client device 102 prevents a user from performing modifications to the given AR element while the first client device 102 is performing modifications. This can be done by way of a lock or unlock state stored in the entity associated with the given AR element. Any client device 102 that obtains a lock state in the entity is allowed to perform real-time modifications. Other client devices 102 can determine that the entity is in a locked state and are prevented from performing real-time modifications to the given AR element. Other AR elements presented or included in the first and second AR experience can continue to be updated or modified in non-real time, such that changes made to those other AR elements are exchanged over a lower bandwidth connection and not via an associated real-time entity.

In some examples, in response to receiving input from the developer that selects the enable real-time AR asset modification option 630, the AR experience development module 500 enables the AR experience to store entity data representing real-time changes, interactions or modifications made with respect to the AR object or element or context of the AR object or element. The AR experience shares the entity with other AR experiences that are associated with the particular AR element and that are actively engaged in a shared AR experience. Specifically, if a given AR object or element is associated with an enabled real-time AR asset modification option 630, modifications made with respect to the location data or contextual data associated with the AR object or element is stored in an entity on a remote server. In some cases, a lock or unlock state is stored in the entity data that identifies the client device 102 that has stored, obtained or requested to perform the real-time modifications to the associated AR object or element. The location data or contextual data is used in real time by other client devices 102 to synchronize changes or modifications made with respect to the given AR object or element across the client devices 102 (involved in the shared AR experience). In some examples, changes or updates made to the real-time entity are automatically broadcast and propagated over a real-time link or high bandwidth connection with all the client devices 102 that are engaged in the shared AR experience. AR elements for which the real-time AR asset modification option 630 has not been enabled can be modified and have their respective modifications exchanged over lower bandwidth connections (non-real-time connections).

In some examples, in response to receiving input from the developer that selects the condition 632, the AR experience development module 500 can present a user interface that allows the developer to specify conditions that need to be met to enable an end user to perform real-time modifications with respect to a given AR element. In some examples, different AR elements that are presented on a same display of an AR experience across a plurality of client devices 102 are associated with different sets of conditions. In such cases, a client device 102 is allowed to perform changes and synchronize such changes across the plurality of client devices 102 for a first AR element for which the conditions are satisfied. Similarly, the client device 102 is prevented from performing changes and synchronizing such changes across the plurality of client devices 102 for a second AR element for which the conditions fail to be satisfied.

For example, the conditions can include a set of geographical locations. In such cases, when a client device 102 receives a request from a user to perform a real-time modification to the given AR element, the client device 102 obtains the conditions including the set of geographical locations. The client device 102 compares a current location of the client device 102 against the set of geographical locations. In response to determining that the client device 102 is within a threshold distance of one or more of the set of geographical locations, the client device 102 enables the end user to perform real-time modifications to the given AR element and to synchronize such modifications across a plurality of client devices 102 in real time. Specifically, the client device 102 enables such modifications to be performed if a lock state of an entity associated with the given AR element is in the unlocked state. In response to determining that the client device 102 is beyond or outside the threshold distance of one or more of the set of geographical locations, the client device 102 prevents the end user from performing real-time modifications to the given AR element.

In some examples, the conditions can include a set of access rights. In such cases, when a client device 102 receives a request from a user to perform a real-time modification to the given AR element, the client device 102 obtains the conditions including the set of access rights. The client device 102 compares an account of the client device 102 against the set of access rights. In response to determining that the account of client device 102 corresponds to the set of access rights, the client device 102 enables the end user to perform real-time modifications to the given AR element and to synchronize such modifications across a plurality of client devices 102 in real time. Specifically, the client device 102 enables such modifications to be performed if a lock state of an entity associated with the given AR element is in the unlocked state. In response to determining that the account of the client device 102 fails to match one or more of the set of access rights, the client device 102 prevents the end user from performing real-time modifications to the given AR element.

In some examples, the conditions can specify or include one or more threshold display positions or ranges of display positions. When the AR element crosses over or reaches a certain threshold display position, control over performing real-time modifications (e.g., control over storing or updating the real-time entity) is transferred from one client device 102 to another. In such cases, when a client device 102 receives a request from a user to perform a real-time modification to the given AR element, the client device 102 obtains the conditions including the one or more threshold display positions or ranges of display positions. The client device 102 compares a current display position of an associated AR element with the one or more threshold display positions or ranges of display positions. In response to determining that the current display position corresponds to the one or more threshold display positions or ranges of display positions, the client device 102 enables the end user to perform real-time modifications to the given AR element and to synchronize such modifications across a plurality of client devices 102 in real time over a high bandwidth connection. Specifically, the client device 102 enables such modifications to be performed if a lock state of an entity associated with the given AR element is in the unlocked state. In response to determining that the display position fails to match one or more threshold display positions or ranges of display positions, the client device 102 prevents the end user from performing real-time modifications to the given AR element.

In some examples, the AR object can correspond to a particular AR graphic that is displayed and can be moved around on a client device 102. In such cases, the client device 102 receives a request from an end user to launch the AR experience. In response, the client device 102 presents the particular AR graphic at a particular default display position. The client device 102 detects input that requests to perform a real-time modification to the particular AR graphic. The client device 102 obtains an entity and change a status of the entity to the locked state in response to determining that one or more conditions for performing real-time modifications are satisfied. In such cases, the client device 102 receives input that moves the particular AR graphic to a particular display position. The client device 102 can also receive input that modifies a visual property of the particular AR graphic (e.g., the input can draw a graphic or text on the particular AR graphic, can adjust a color or style of the particular AR graphic, can adjust an orientation of the particular AR graphic, or any other suitable modification). Such modifications can be stored as contextual information of the particular AR graphic in the entity for the particular AR graphic. Changes or modifications stored in the entity are propagated and broadcast to each of the client devices 102 engaged in the AR experience over a high bandwidth real-time connection. A second client device 102 can present the same particular AR graphic and represent modifications stored in the entity in real-time as such changes or modifications are propagated to the second client device 102.

In some cases, when the one or more conditions for performing real-time modifications are satisfied, the client device 102 accesses the AR bundle to determine if the enable real-time AR asset modification option 630 has been set or selected for the particular AR graphic. In response to determining that the option 630 has been set or selected for the particular AR graphic and/or that the one or more conditions are satisfied or met, the client device 102 communicates with the AR asset synchronization module 510 to obtain an entity or entity data associated with the particular AR graphic. The entity data specifies a lock state associated with the particular AR graphic as being in the locked or unlocked state. If the entity data indicates that the lock state is in the unlocked state, the client device 102 is enabled or authorized to allow a user to perform one or more modifications to the particular AR graphic after changing the entity state to the locked state (to prevent a second client device 102 from performing interactions with the particular AR graphic). If the entity data indicates that the lock state is in the locked state, the client device 102 is prevented from allowing a user to perform one or more modifications to the particular AR graphic.

The entity data can store any set of information that specifies modifications made to the location of the particular AR graphic, such as with respect to one or more real-world objects depicted in the image captured by the client device 102 (prior to the AR experience being terminated). The data can also or in the alternative include any set of information that represents the contextual information or modifications performed with respect to the particular AR graphic. The data can be maintained and stored locally by the client device 102. In some examples, the data is communicated back to the remote server associated with the client device 102 and stored in an account of the client device 102 or as part of the data of the AR experience bundle. The changes or modifications made in the entity data are exchanged, broadcast or propagated over a high bandwidth real time connection to all client devices 102 involved in the AR experience.

In real time (while the AR experience is presented or accessed by a second client device 102), the second client device 102 updates the particular AR graphic based on modifications stored in the entity data for the particular AR graphic. Namely, a first client device 102 (that has stored changes in the entity data) propagates or transmits such entity data to the second client device 102. The second client device 102 receives and decodes the data stored in the entity data to update the display and/or contextual information associated with the particular AR graphic that is displayed by the second client device 102. In this way, changes made to the particular AR graphic by the first client device 102 are synchronized in real-time to one or more other client devices 102, such as the second client device 102. Changes made to other AR graphics or elements can continue to be exchanged over the network.

The AR asset generation module 520 can receive a new image captured by the client device 102. The AR asset generation module 520 processes the new image based on the stored entity data to automatically position one or more AR elements associated with the entity within the new image relative to one or more real-world objects or landmarks depicted in the new image.

Figure 7:
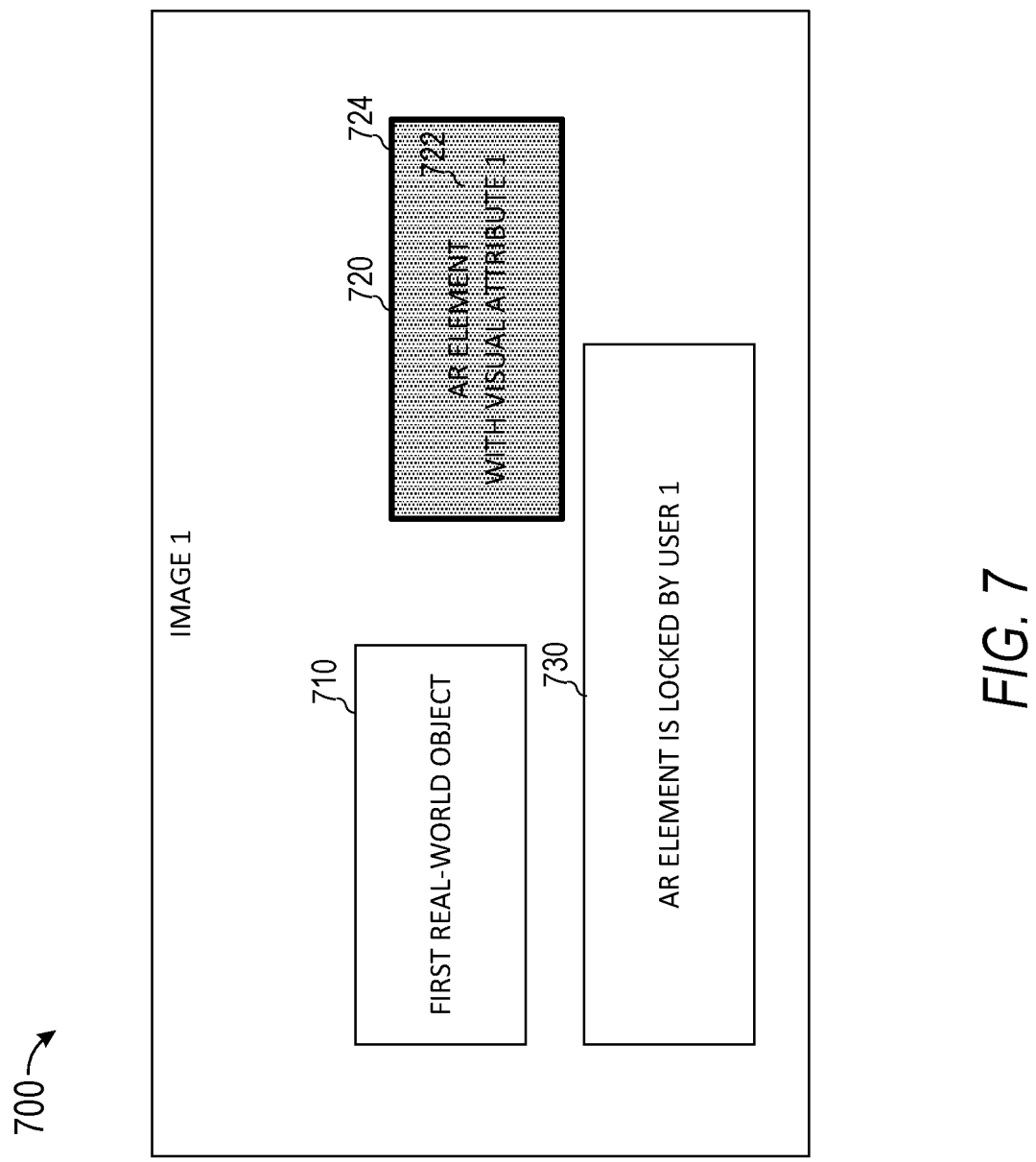
Figure 8:
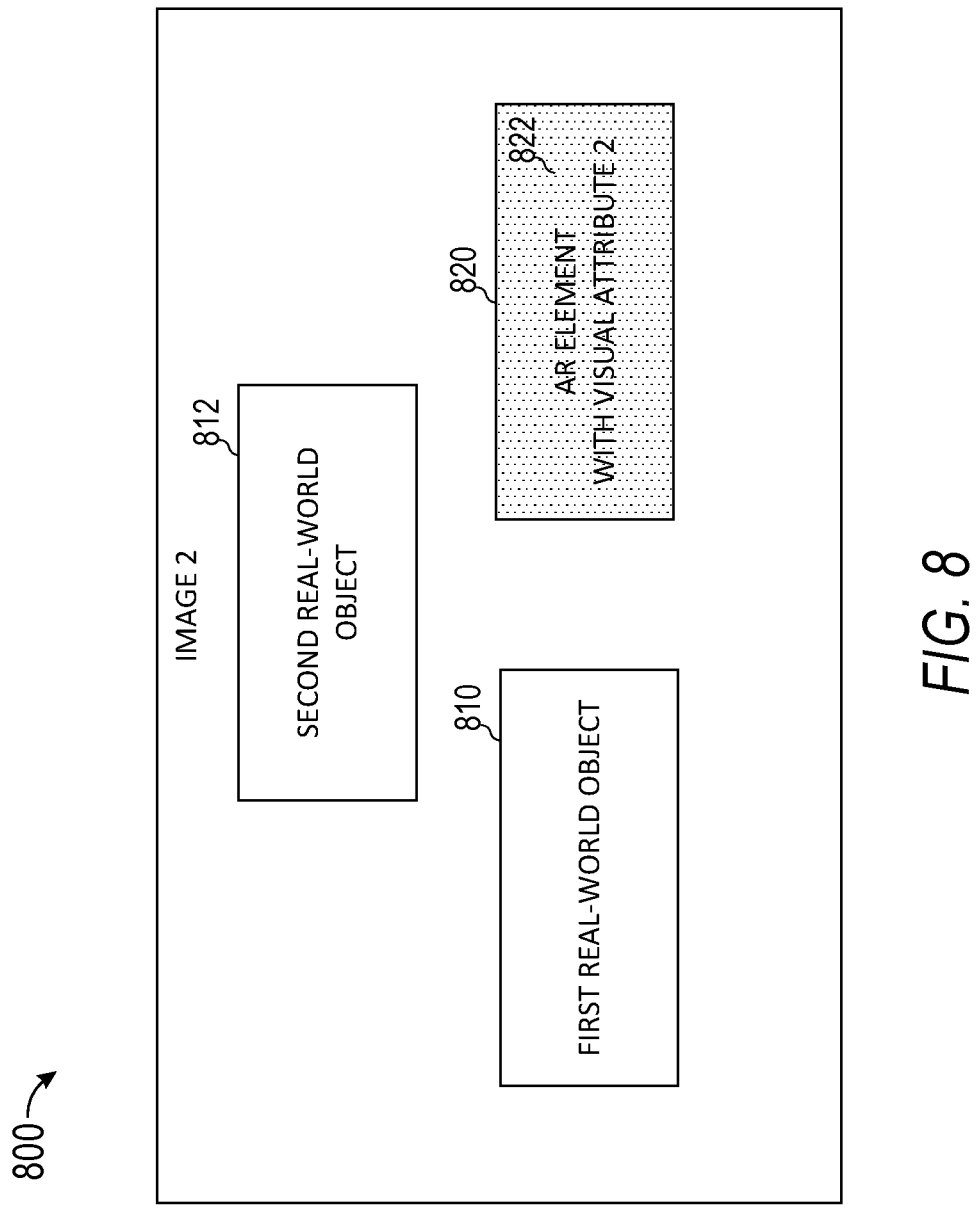

FIGS. 7-8 are diagrammatic representations of outputs of the real-time AR element modification system 224, in accordance with some examples. As shown in FIG. 7, the first client device 102 presents a user interface 700 corresponding to or generated by a first shared AR experience. The user interface 700 includes a first image captured or received by a camera of the first client device 102. The first image depicts a first real-world object 710. The first AR experience can cause a first AR element 720 to be presented within the first image, such as at a default position and with default visual attributes. The first AR element 720 includes a first set of visual attributes 722, such as a particular display position, orientation, and certain contextual information of the AR element 720. Concurrently with the user interface 700, a user interface 800 (FIG. 8) is presented on a second client device 102 to a user that is also accessing the first shared AR experience with a second client device 102. Namely, a shared AR experience or session can be established between the first and second client devices 102 so that content of the AR experience can be synchronized across the first and second client devices 102.

The first client device 102 can receive input from the user that requests to perform a real-time interaction with the first AR element 720. In response, the first client device 102 accesses one or more conditions for performing real-time modifications to the first AR element 720 and determines that the first AR element 720 is enabled for real-time modification synchronization. If the first client device 102 determines that the one or more conditions are satisfied, the first client device 102 accesses real-time entity data associated with the first AR element 720. The first client device 102 obtains a lock state stored in the entity data. In response to determining that the lock state indicates that the first AR element 720 is in the unlocked state, the first client device 102 permits or allows the user to perform the requested real-time interaction. The first client device 102 updates the lock state in the entity data for the first AR element 720 to change the lock state from unlocked to the locked state. The first client device 102 can also update a visual attribute of the first AR element 720 to visually inform one or more users of the first client device 102 and/or the second client device 102 that the first AR element 720 is currently associated with a locked entity state and is being modified in real-time by a particular client device 102.

Namely, the first client device 102 updates data stored in the entity. In response, the updated data is broadcast or propagated over a real-time connection to the second client device 102. This results in an instant update to the display attributes of the first AR element 720 presented on the second client device 102. Changes made to other AR elements can continue to be exchanged over a lower bandwidth connection between the first and second client devices 102.

In some cases, the second client device 102 receives a request to perform a real-time interaction or modification with the first AR element 720. The second client device 102 determines that the lock state of the entity data indicates that the first AR element 720 is in the locked state. In such cases, the second client device 102 presents a message or prompt 730 to a user on the second client device 102 informing the user that the first AR element 720 is in a locked state and that real-time interactions on the second client device 102 are prevented. The message or prompt 730 can also be presented on all of the other client devices 102 involved in the shared AR experience, such as on the first client device 102.

In some examples, the second client device 102 accesses entity data for one or more other AR elements that are presented on the user interface 700. The second client device 102 can visually distinguish or present indicators for each of the one or more other AR elements that are associated with entity data that is in the unlocked state. This informs the users which AR elements can be requested to be modified in real time. The second client device 102 receives a request from the user to perform a real-time interaction with the one or more other AR elements. The second client device 102 evaluates satisfaction of conditions associated with the one or more other AR elements. Thereafter, the second client device 102 updates the entity state to the locked state and propagates any changes made by the second client device 102 to other client devices 102 involved in the shared AR experience. In this way, the first client device an interact with the first AR element 720 in real time to have modifications synchronized with the second client device 102. Concurrently with the modifications of the first AR element 720 being made and synchronized in real time, the second client device 102 can interact with one or more other AR elements in real time to have modifications synchronized with the first client device 102. In addition, another set of AR elements that are not enabled for real-time modification synchronization by the AR developer (and/or for which the conditions are not satisfied) can continue to be updated over a lower bandwidth connection. In this way, certain AR elements can have their respective changes reflected in real-time while other AR elements can have their respective changes reflected in non-real-time. This reduces the amount of data that is exchanged and transmitted over a network which improves the overall efficiency of the system.

In some examples, the first client device 102 modifies the first AR element 720 position or visual attributes. This causes the first AR experience to position the AR element 720 at a particular orientation and distance (e.g., placement) relative to the first real-world object 710. The client device 102 can store the updates in the entity data for the first AR element 720. The user interface 800 presented on the second client device 102 also shows the first real-world object 810 and includes a second real-world object 812. The second client device 102 presents the AR element 820 (corresponding to the first AR element 720) based on the entity data received from the first client device 102 in real time. For example, the user interface 800 presents the AR element 820 reflecting a second visual attribute 822 corresponding to the real-time modifications made by the first client device 102 using user interface 700.

Figure 9:
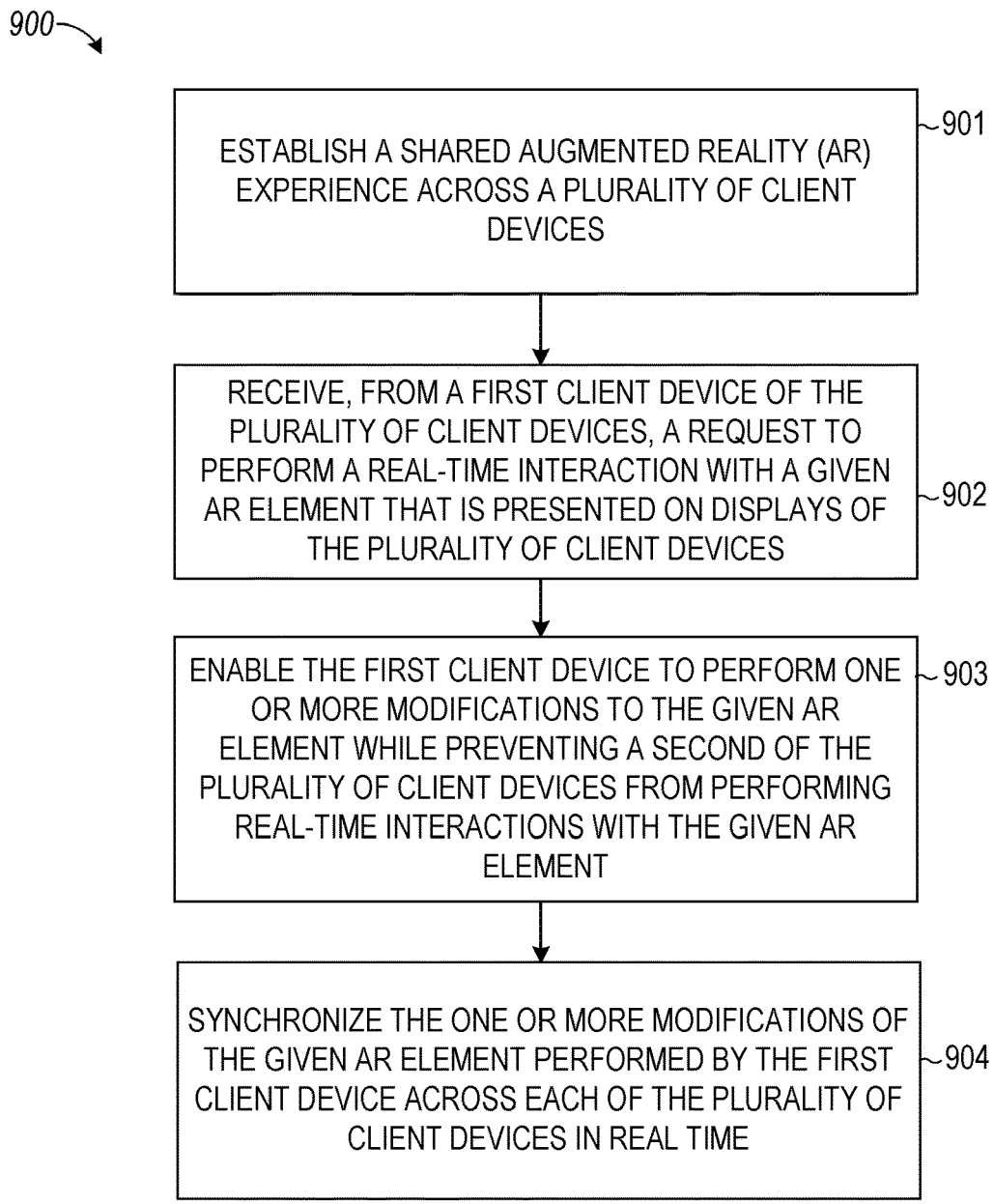
FIG. 9 is a flowchart illustrating example operations of the real-time AR element modification system, according to some examples.

FIG. 9 is a flowchart of a process 900 performed by the real-time AR element modification system 224, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the real-time AR element modification system 224 (e.g., a client device 102 or a server) establishes a shared AR experience across a plurality of client devices, as discussed above.

At operation 902, the real-time AR element modification system 224 receives, from a first client device of the plurality of client devices, a request to perform a real-time interaction with a given AR element that is presented on displays of the plurality of client devices, as discussed above.

At operation 903, the real-time AR element modification system 224, in response to receiving the request, enables the first client device to perform one or more modifications to the given AR element while preventing a second of the plurality of client devices from performing real-time interactions with the given AR element, as discussed above.

At operation 904, the real-time AR element modification system 224 synchronizes the one or more modifications of the given AR element performed by the first client device across each of the plurality of client devices in real time, as discussed above.

Machine Architecture

Figure 10:
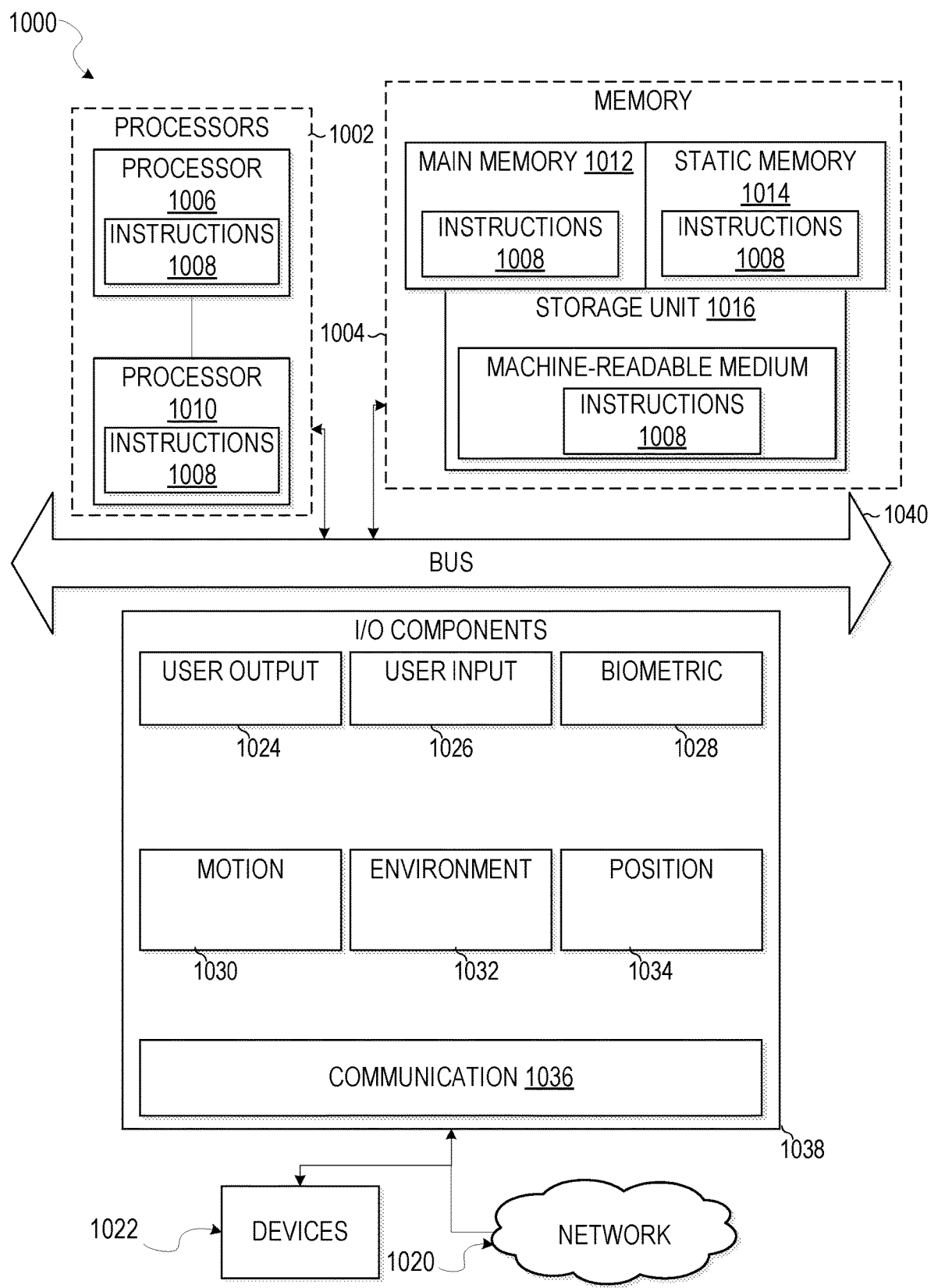
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of a machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1012, the static memory 1014, and the storage unit 1016 store the instructions 1008 embodying any one or more of the methodologies or functions described herein. The instructions 1008 may also reside, completely or partially, within the main memory 1012, within the static memory 1014, within a machine-readable medium within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Software Architecture

Figure 11:
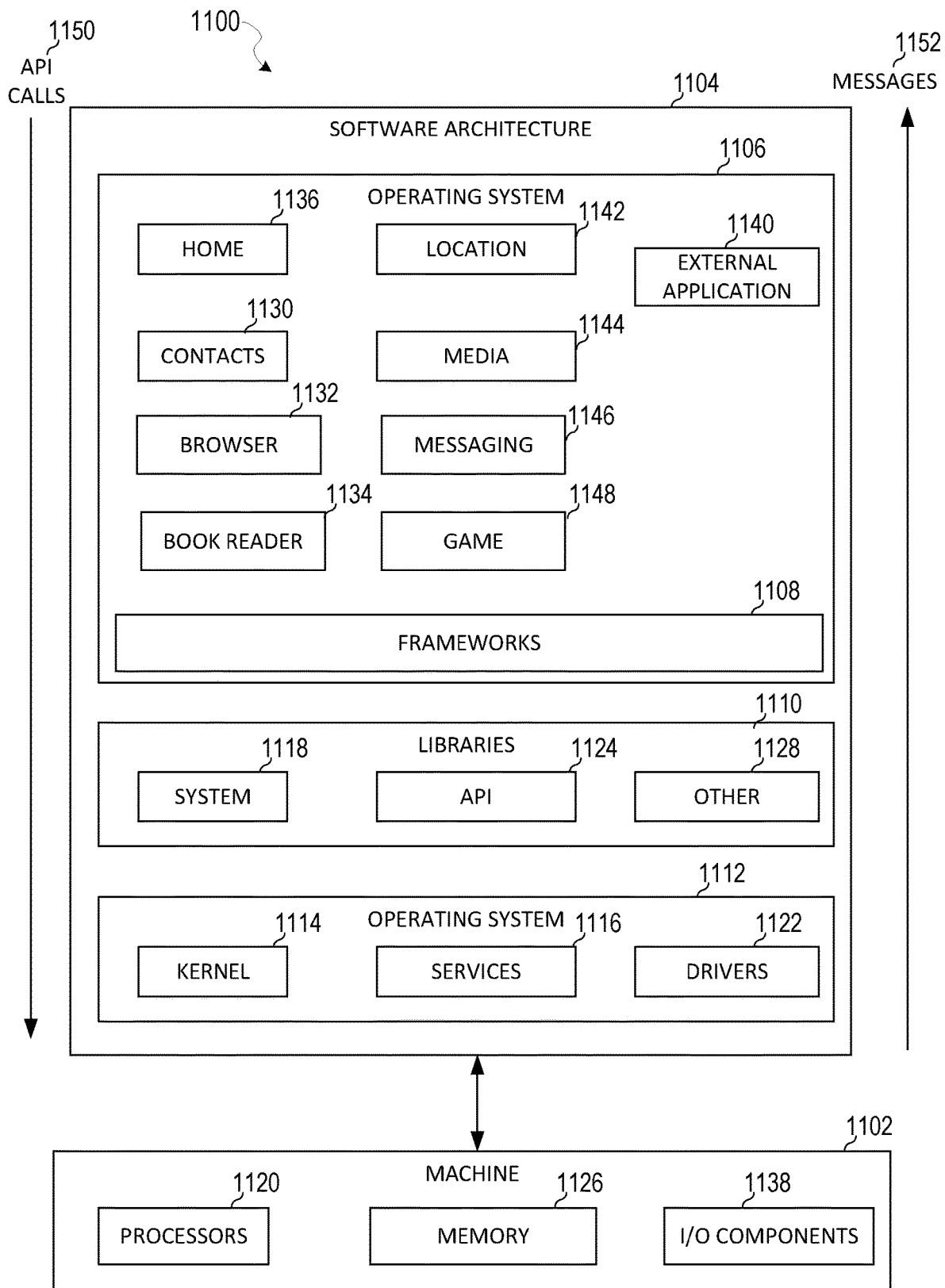
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1140 can invoke the API calls 1150 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1002 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
    establishing a shared augmented reality (AR) experience across a plurality of devices, the shared AR experience comprising a first AR experience in a linked set of AR experiences comprising a second AR experience, the first AR experience comprising a first AR experience bundle that includes configuration data and code for controlling visual appearance, interaction and behavior of a first set of AR elements of the first AR experience, and the second AR experience comprising a second AR experience bundle that includes configuration data and code for controlling visual appearance, interaction and behavior of a second set of AR elements of the second AR experience, the shared AR experience being launched on each of the plurality of devices by executing the code of the first AR experience bundle;
    receiving, from a first device of the plurality of devices, a request to perform a real-time interaction with a given AR element that is presented on displays of the plurality of devices;
    in response to receiving the request, receiving input from the first device that applies one or more graphical elements to the given AR element of the first AR experience;
    while the input from the first device that applies the one or more graphical elements to the given AR element is being received, preventing a second device of the plurality of devices from modifying a set of visual properties of the given AR element;
    synchronizing one or more modifications of the given AR element of the first AR experience performed by the first device across each of the plurality of devices in real time;
    determining that the second AR experience is in the linked set of AR experiences that includes the first AR experience in response to receiving a request to launch the second AR experience;
    in response to determining that the second AR experience is in the linked set of AR experiences that includes the first AR experience, detecting that the given AR element is shared between the first and second AR experiences, a portion of the second set of AR elements of the second AR experience bundle comprising the given AR element that is included among the first set of AR elements of the first AR experience; and
    in response to detecting that the given AR element is shared between the first and second AR experiences, obtaining entity data generated using the first AR experience comprising the one or more modifications and using the obtained entity data to control and display a set of AR elements of the second AR experience.

2. The method of claim 1, further comprising locking an entity associated with the given AR element in response to receiving the request, wherein receiving the input from the first device that applies one or more graphical elements to the given AR element comprises receiving input that adds text or graphics to the given AR element, the first and second AR experience bundles both being implemented on an individual one of the plurality of devices.

3. The method of claim 2, wherein synchronizing the one or more modifications comprises:
    modifying the entity associated with the given AR element to represent the one or more modifications; and
    propagating the modified entity across each of the plurality of devices in real time.

4. The method of claim 1, wherein synchronizing the one or more modifications comprises:
    sending the one or more modifications of the given AR element over a first connection to each of the plurality of devices;
    causing a display of the given AR element to be consistent across each of the plurality of devices in real time; and
    synchronizing one or more modifications associated with a second AR element that is included in the first AR experience over a second connection that is associated with lower bandwidth than the first connection.

5. The method of claim 1, further comprising:
    accessing an entity associated with the given AR element in response to receiving the request;
    determining a lock state associated with the entity; and
    enabling the first device to perform one or more modifications to the given AR element in response to determining that the entity is in an unlocked state.

6. The method of claim 1, further comprising:
    receiving, from the second device, a request to perform a real-time interaction with the given AR element;
    in response to receiving, from the second device, the request to perform a real-time interaction with the given AR element, modifying a visual attribute of the given AR element to visually inform one or more users of the first device that the given AR element is currently being modified in real-time by the second device.

7. The method of claim 1, wherein an entity representing the one or more modifications to the given AR element is stored on a remote server associated with the plurality of devices, the entity being configured to broadcast changes associated with the given AR element over a real-time link.

8. The method of claim 1, wherein the shared AR experience is launched by a respective messaging application implemented each of the plurality of devices.

9. The method of claim 1, further comprising:
accessing one or more conditions for performing real-time interactions with the given AR element;
determining that the one or more conditions are satisfied; and
allowing the first device to perform the one or more modifications in response to determining that the one or more conditions are satisfied.

10. The method of claim 9, wherein a first set of the one or more conditions is associated with the given AR element, and wherein a second set of conditions is associated with a different AR element that is presented on the displays of the plurality of devices.

11. The method of claim 9, wherein the one or more conditions are associated with at least one of access rights, credentials, a threshold display position in the shared AR experience, or a geographical location.

12. The method of claim 11, wherein determining that the one or more conditions are satisfied comprises determining that a current geographical location of the first device is within a threshold distance of the geographical location associated with the one or more conditions.

13. The method of claim 11, wherein the shared AR experience comprises an AR gaming application, further comprising:
determining that an AR gaming object comprising the given AR element is at a first AR position;
while the AR gaming object is at the first AR position, enabling the first device to perform the real-time interaction with the AR gaming object while preventing the second device from performing real-time interactions with the AR gaming object;
determining that the AR gaming object has moved to a second AR position that crosses a threshold location; and
in response to determining that the AR gaming object has moved to the second AR position that crosses the threshold location, transitioning control over the AR gaming object to enable the second device to perform the real-time interactions with the AR gaming object instead of the first device.

14. The method of claim 1, wherein an entity representing a state of the given AR element is saved on a remote server in response to the shared AR experience being terminated by each of the plurality of devices.

15. The method of claim 1, wherein the shared AR experience is developed using an AR developer platform, the AR developer platform comprising a graphical user interface for enabling performance of real-time interactions with AR elements.

16. The method of claim 15, wherein the graphical user interface comprises:
a list of AR elements associated with the shared AR experience, the graphical user interface comprising a first option associated with a first AR element of the list of AR elements, the first option enabling exclusive access to performing modifications to the first AR element in response to selection of the first option, the first option causing the first AR element to be associated with an entity that broadcasts the modifications over a real time connection.

17. The method of claim 16, wherein the graphical user interface comprises a second option for specifying one or more conditions to enable the exclusive access for performing modifications to the first AR element.

18. The method of claim 16, wherein the graphical user interface comprises a second option associated with a second AR element of the list of AR elements, the second option causing modifications made to the second AR element to be exchanged over a lower bandwidth connection than the real time connection.

19. A system comprising:
at least one processor; and
a memory component having instructions stored thereon that, when executed by the at least one processor, cause the at least one processor to perform operations comprising:
establishing a shared augmented reality (AR) experience across a plurality of devices, the shared AR experience comprising a first AR experience in a linked set of AR experiences comprising a second AR experience, the first AR experience comprising a first AR experience bundle that includes configuration data and code for controlling visual appearance, interaction and behavior of a first set of AR elements of the first AR experience, and the second AR experience comprising a second AR experience bundle that includes configuration data and code for controlling visual appearance, interaction and behavior of a second set of AR elements of the second AR experience, the shared AR experience being launched on each of the plurality of devices by executing the code of the first AR experience bundle;
receiving, from a first device of the plurality of devices, a request to perform a real-time interaction with a given AR element that is presented on displays of the plurality of devices;
in response to receiving the request, receiving input from the first device that applies one or more graphical elements to the given AR element of the first AR experience;
while the input from the first device that applies the one or more graphical elements to the given AR element is being received, preventing a second device of the plurality of devices from modifying a set of visual properties of the given AR element;
synchronizing one or more modifications of the given AR element of the first AR experience performed by the first device across each of the plurality of devices in real time;
determining that the second AR experience is in the linked set of AR experiences that includes the first AR experience in response to receiving a request to launch the second AR experience;
in response to determining that the second AR experience is in the linked set of AR experiences that includes the first AR experience, detecting that the given AR element is shared between the first and second AR experiences, a portion of the second set of AR elements of the second AR experience bundle comprising the given AR element that is included among the first set of AR elements of the first AR experience; and
in response to detecting that the given AR element is shared between the first and second AR experiences, obtaining entity data generated using the first AR experience comprising the one or more modifications and using the obtained entity data to control and display a set of AR elements of the second AR experience.

20. A non-transitory computer-readable storage medium having stored thereon instructions that, when executed by at least one processor, cause the at least one processor to perform operations comprising:

establishing a shared augmented reality (AR) experience across a plurality of devices, the shared AR experience comprising a first AR experience in a linked set of AR experiences comprising a second AR experience, the first AR experience comprising a first AR experience bundle that includes configuration data and code for controlling visual appearance, interaction and behavior of a first set of AR elements of the first AR experience, and the second AR experience comprising a second AR experience bundle that includes configuration data and code for controlling visual appearance, interaction and behavior of a second set of AR elements of the second AR experience, the shared AR experience being launched on each of the plurality of devices by executing the code of the first AR experience bundle;

receiving, from a first device of the plurality of devices, a request to perform a real-time interaction with a given AR element that is presented on displays of the plurality of devices;

in response to receiving the request, receiving input from the first device that applies one or more graphical elements to the given AR element of the first AR experience;

while the input from the first device that applies the one or more graphical elements to the given AR element is being received, preventing a second device of the plurality of devices from modifying a set of visual properties of the given AR element;

synchronizing one or more modifications of the given AR element of the first AR experience performed by the first device across each of the plurality of devices in real time;

determining that the second AR experience is in the linked set of AR experiences that includes the first AR experience in response to receiving a request to launch the second AR experience;

in response to determining that the second AR experience is in the linked set of AR experiences that includes the first AR experience, detecting that the given AR element is shared between the first and second AR experiences, a portion of the second set of AR elements of the second AR experience bundle comprising the given AR element that is included among the first set of AR elements of the first AR experience; and in response to detecting that the given AR element is shared between the first and second AR experiences, obtaining entity data generated using the first AR experience comprising the one or more modifications and using the obtained entity data to control and display a set of AR elements of the second AR experience.

* * * * *